(12) United States Patent
Wei et al.

(10) Patent No.: US 11,441,895 B2
(45) Date of Patent: Sep. 13, 2022

(54) CONTROL METHOD, DEPTH CAMERA AND ELECTRONIC DEVICE

(71) Applicant: Guangdong Oppo Mobile Telecommunications Corp., Ltd., Guangdong (CN)

(72) Inventors: Yi Wei, Guangdong (CN); Xueyong Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 618 days.

(21) Appl. No.: 16/451,737

(22) Filed: Jun. 25, 2019

(65) Prior Publication Data

US 2019/0320161 A1    Oct. 17, 2019

Related U.S. Application Data

(63) Continuation of application No. PCT/CN2019/075390, filed on Feb. 18, 2019.

(30) Foreign Application Priority Data

Mar. 12, 2018  (CN) .......................... 201810200433.X
Mar. 12, 2018  (CN) ........................... 201810200875.4
(Continued)

(51) Int. Cl.
*G01C 3/08*    (2006.01)
*G01B 11/25*    (2006.01)
(Continued)

(52) U.S. Cl.
CPC ................ *G01B 11/25* (2013.01); *G06T 7/55* (2017.01); *G06V 40/166* (2022.01);
(Continued)

(58) Field of Classification Search
CPC .... B60R 21/00; G02B 26/0858; G02B 26/10; G02B 26/105; G02B 26/12;
(Continued)

(56) References Cited

U.S. PATENT DOCUMENTS

2012/0126002 A1*  5/2012  Rudich ...................... F41G 1/54
                                                             235/404
2015/0042870 A1    2/2015  Chan et al.
(Continued)

FOREIGN PATENT DOCUMENTS

CN          1667354 A     9/2005
CN          1798249 A     7/2006
(Continued)

OTHER PUBLICATIONS

English translation of first OA for CN application 201810200875.4.
(Continued)

*Primary Examiner* — Masum Billah
(74) *Attorney, Agent, or Firm* — Young Basile Hanlon & MacFarlane, P.C.

(57) ABSTRACT

The present disclosure provides a method for controlling a laser projection module, a device for controlling a laser projection module, a depth camera and an electronic device. The laser projection module includes a laser emitter. The laser emitter includes a plurality of point light sources. The plurality of point light sources are grouped to form a plurality of light-emitting arrays, and the plurality of the light-emitting arrays are controlled independently. The method includes: obtaining a current distance between the laser projection module and the user; determining a target number of the light-emitting arrays from the plurality of light-emitting arrays according to the current distance; and activating point light sources in a target number of point light sources of the light-emitting arrays.

19 Claims, 23 Drawing Sheets

(30) Foreign Application Priority Data

Mar. 12, 2018 (CN) .......................... 201810201627.1
Mar. 12, 2018 (CN) .......................... 201810202149.6

(51) Int. Cl.
| | | |
|---|---|---|
| H04N 13/254 | (2018.01) | |
| G06T 7/55 | (2017.01) | |
| H05B 47/115 | (2020.01) | |
| H05B 47/125 | (2020.01) | |
| G06V 40/16 | (2022.01) | |
| H04N 5/225 | (2006.01) | |

(52) U.S. Cl.
CPC ......... *G06V 40/171* (2022.01); *H04N 13/254* (2018.05); *H05B 47/115* (2020.01); *H05B 47/125* (2020.01); *G06T 2207/10028* (2013.01); *G06T 2207/30201* (2013.01); *H04N 5/2252* (2013.01)

(58) Field of Classification Search
CPC ............ G02B 27/4205; G03B 21/2013; G03B 21/2033; G06V 40/166; G06V 40/161; G06V 40/171; G01B 11/25; G06T 2207/10028; G06T 2207/30201; G06T 7/55
USPC ............................................................ 356/4
See application file for complete search history.

(56) References Cited

U.S. PATENT DOCUMENTS

| | | | |
|---|---|---|---|
| 2015/0042871 A1 | 2/2015 | Zheng | |
| 2016/0088241 A1 | 3/2016 | Sung et al. | |
| 2016/0109232 A1* | 4/2016 | Shin ....................... G01C 3/085 348/140 | |
| 2020/0186767 A1* | 6/2020 | Watanabe ............ H04N 9/3185 | |

FOREIGN PATENT DOCUMENTS

| | | | | | |
|---|---|---|---|---|---|
| CN | 102645828 | A | 8/2012 | | |
| CN | 103576428 | A | 2/2014 | | |
| CN | 103793105 | A | 5/2014 | | |
| CN | 204206551 | U | 3/2015 | | |
| CN | 104680113 | A | 6/2015 | | |
| CN | 104794506 | A | 7/2015 | | |
| CN | 105373223 | A | 3/2016 | | |
| CN | 105407615 | A | 3/2016 | | |
| CN | 105791681 | A | 7/2016 | | |
| CN | 105842956 | A | 8/2016 | | |
| CN | 105874473 | A | 8/2016 | | |
| CN | 106200979 | A | 12/2016 | | |
| CN | 106203285 | A | 12/2016 | | |
| CN | 106954017 | A | 7/2017 | | |
| CN | 106972347 | A | 7/2017 | | |
| CN | 107181918 | A | 9/2017 | | |
| CN | 107222685 | A | 9/2017 | | |
| CN | 107229173 | A | 10/2017 | | |
| CN | 107330316 | A | 11/2017 | | |
| CN | 107424188 | A * | 12/2017 | ......... | G01B 11/2513 |
| CN | 107490869 | A | 12/2017 | | |
| CN | 107515509 | A | 12/2017 | | |
| CN | 206877030 | U | 1/2018 | | |
| CN | 107680128 | A | 2/2018 | | |
| CN | 107687841 | A | 2/2018 | | |
| CN | 108227361 | A | 6/2018 | | |
| CN | 108333860 | A | 7/2018 | | |
| CN | 108509867 | A | 9/2018 | | |
| CN | 108594451 | A | 9/2018 | | |
| DE | 69928203 | T2 * | 11/2006 | ........... | G01C 15/004 |
| EP | 2477240 | A1 | 7/2012 | | |
| EP | 3567427 | A1 | 11/2019 | | |
| JP | 2009122523 | A | 6/2009 | | |
| JP | 2013020569 | A * | 1/2013 | | |
| TW | 497000 | B | 8/2002 | | |
| TW | 201734621 | A | 10/2017 | | |

OTHER PUBLICATIONS

First OA for CN application 201810200875.4.
English translation of second OA for CN application 201810200875.4.
The second OA for CN application 201810200875.4.
English translation of OA for CN application 201810201627.1.
OA for CN application 201810201627.1.
English translation of ISR for PCT application PCTCN2019075390.
ISR for PCT application PCTCN2019075390.
Extended EP Search Report for EP Application No. 19742274.4 dated Mar. 16, 2020.
English Translation of Notification of Registration for Chinese Application No. 201810200433.X dated Apr. 1, 2020.
Chinese Second Office Action with English Translation for CN Application 202010370932.0 dated Oct. 26, 2021. (11 pages).
Communication pursuant to Article 94(3) EPC for EP Application 19742274.4 dated Sep. 15, 2021. (6 pages).
Indian Examination Report for IN Application 201917031765 dated Aug. 18, 2021. (5 pages).
Office Action issued for TW application 108108334 with English translation.
Office Action issued for corresponding CN application 201810200875.4 with English translation, dated Aug. 1, 2019.
Office Action issued for corresponding CN application 201810200433.X with English translation, dated Aug. 20, 2019.
Office Action issued for corresponding CN application 201810202149.6 with English translation, dated Jun. 24, 2019.
Chinese Office Action with English Translation for CN Application 202010370932.0 dated Apr. 27, 2021. (20 pages).

* cited by examiner

CONTROL METHOD, DEPTH CAMERA AND ELECTRONIC DEVICE

CROSS-REFERENCE TO RELATED APPLICATION(S)

This application is a continuation application of PCT International Application No. PCT/CN2019/075390, filed on Feb. 18, 2019, which claims priorities to and benefits of Chinese patent applications Serial No. 201810200433.X, filed on Mar. 12, 2018, 201810201627.1, filed on Mar. 12, 2018, 201810202149.6, filed on Mar. 12, 2018, and 201810200875.4, filed on Mar. 12, 2018, the entire contents of all of which are hereby incorporated herein by reference.

TECHNICAL FIELD

The present disclosure relates to the field of imaging technology, and more particularly, to a method and a device for controlling a laser projection module, a depth camera and an electronic device.

BACKGROUND

A laser projection module may be configured to emit laser light carrying predetermined pattern information, and to project the laser light onto a target user located in space. A laser pattern reflected by the target user may be captured through an imaging device (e.g. an infrared camera) to further obtain a depth image of the target user.

SUMMARY

A laser projection module according to implementations of the present disclosure includes a laser emitter. The laser emitter includes a plurality of point light sources. The plurality of the point light sources are grouped to form a plurality of light-emitting arrays. The plurality of the light-emitting arrays are controlled independently. A method for controlling the laser projection module includes: obtaining a current distance between the laser projection module and a user; determining a target number of light-emitting arrays from the plurality of light-emitting arrays according to the current distance; and activating point light sources in the target number of the light-emitting arrays.

A depth camera according to implementations of the present disclosure includes an imager and a laser projection module. The laser projection module includes a laser emitter. The laser emitter includes a plurality of point light sources. The plurality of the point light sources are grouped to form a plurality of light-emitting arrays. The plurality of the light-emitting arrays are controlled independently. The depth camera further includes a processor. The processor is configured to: obtain a current distance between the laser projection module and a user; determine a target number of light-emitting arrays from the plurality of light-emitting arrays according to the current distance; and activate point light sources in the target number of the light-emitting arrays.

An electronic device according to implementations of the present disclosure includes a housing and the depth camera described above. The depth camera is disposed in the housing and exposed from the housing to obtain a depth image.

Additional aspects and advantages of implementations of the present disclosure will be given in part in the following descriptions, become apparent in part from the following descriptions, or be learned from the practice of the present disclosure.

BRIEF DESCRIPTION OF DRAWINGS

Above and additional aspects and advantages of the present disclosure will become apparent and more readily appreciated from the following descriptions made to implementations with reference to accompanying drawings, in which.

DETAILED DESCRIPTION

Figure 1:
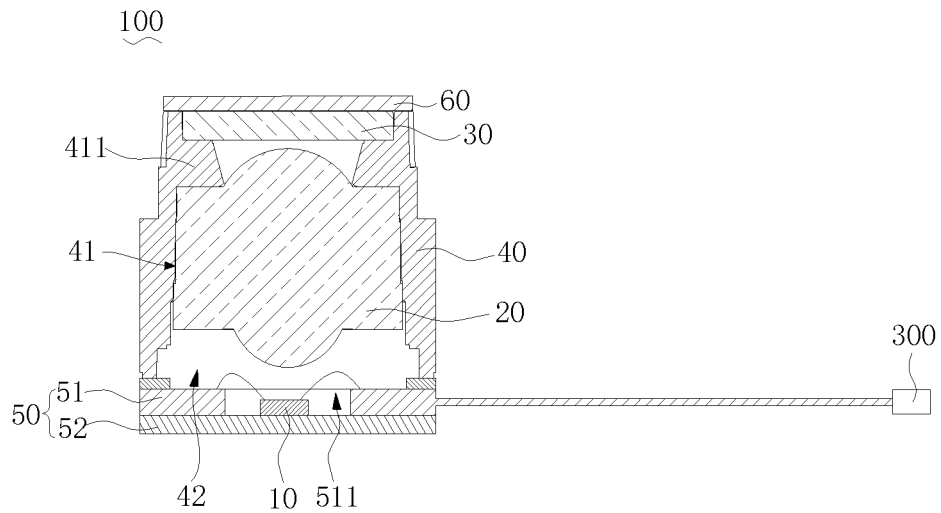
FIG. 1 is a schematic diagram illustrating a laser projection module according to some implementations of the present disclosure.

Embodiments of the present disclosure will be described in detail and examples of embodiments are illustrated in the drawings. The same or similar elements and the elements having the same or similar functions are denoted by like reference numerals throughout the description. Embodiments described herein with reference to drawings are explanatory, serve to explain the present disclosure, and are not construed to limit embodiments of the present disclosure.

In descriptions of the present disclosure, it should be understood that, terms such as "first", "second" are used herein for purposes of description and are not intended to indicate or imply relative importance or implicitly indicate the number of technical features. Therefore, the feature defined with "first", "second" may explicitly or implicitly include one or more this feature. In descriptions of the present disclosure, the term "a plurality of" means two or more than two, unless specified explicitly otherwise.

A laser projection module may be configured to emit laser light carrying predetermined pattern information, and to project the laser light onto a target user located in space. A laser pattern reflected by the target user may be captured through an imaging device (e.g. an infrared camera) to further obtain a depth image of the target user. However, improper control of emission of the laser light by the laser projector may easily cause damage to the user.

Therefore, implementations of the present disclosure provide a method and a device for controlling a laser projection module, a depth camera and an electronic device.

Before the method and the device for controlling a laser projection module, the depth camera and the electronic device are described, the laser projection module may be described as below.

Figure 5:
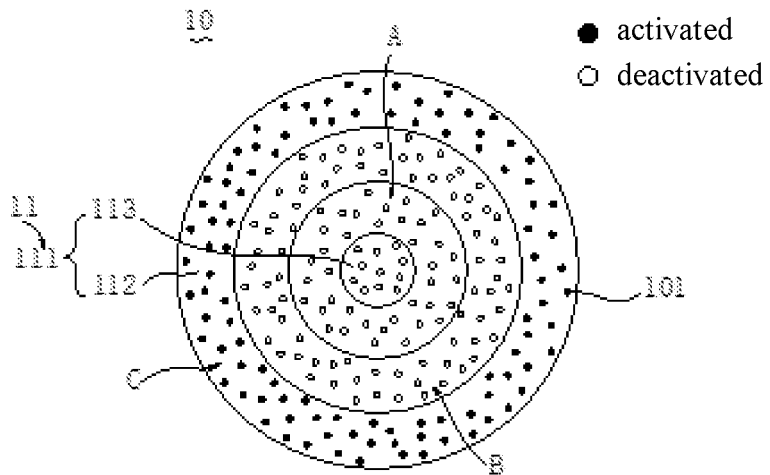
FIG. 5 is a schematic diagram illustrating that laser emitters included in a laser projection module include a circular sub-array and multiple annular sub-arrays according to some implementations of the present disclosure.

As illustrated in FIG. 1, the laser projection module 100 includes a laser emitter 10, a collimating element 20, a diffractive element 30, a lens tube 40, a substrate component 50 and a protective cover 60. The laser emitter 10 may be a vertical-cavity surface-emitting laser (VCSEL). The vertical-cavity surface-emitting laser includes a plurality of point light sources 101 (as illustrated in FIG. 5). The laser emitter 10 is configured to emit laser light. The collimating element 20 is configured to collimate the laser light emitted by the laser emitter 10. The diffractive element 30 is configured to diffract the laser light collimated by the collimating element 20 to form the laser pattern. The lens tube 40 is disposed on the substrate component 50. A side wall 41 of the lens tube 40 and the substrate component 50 define a receiving cavity 42. The substrate component 50 includes a substrate 52 and a circuit board 51 carried on the substrate 52. The circuit board 51 is provided with a through hole 511. The laser emitter 10 is carried on the substrate 52 and received in the through hole 511. The collimating element 20 and the diffractive element 30 are sequentially arranged in a light-emitting direction of the laser emitter 10. The side wall 41 of lens tube 40 extends to a center of the receiving cavity 42 to form a carrying stage 411. The diffractive element 30 is carried on the carrying stage 411.

The protective cover 60 may be made of light transmission materials, such as glass, polymethyl methacrylate (PMMA), polycarbonate (PC), polyimide (PI), or the like. Since the light transmission materials, such as glass, PMMA, PC and PI, all have an excellent light transmission property, it is unnecessary for the protective cover 60 to be provided with a light through hole. In this manner, the protective cover 60 can prevent the diffractive element 30 from being exposed outside the lens tube 40 while preventing the diffractive element 30 from falling off, thereby enabling the diffractive element 30 not suffered from water and dust. Certainly, in other implementations, the protective cover 60 may be provided with a light through hole. The light through hole may be opposed to an optically effective region of the diffractive element 30 to avoid blocking a light path of the diffractive element 30.

The method for controlling a laser projection module will be described below.

Figure 2:
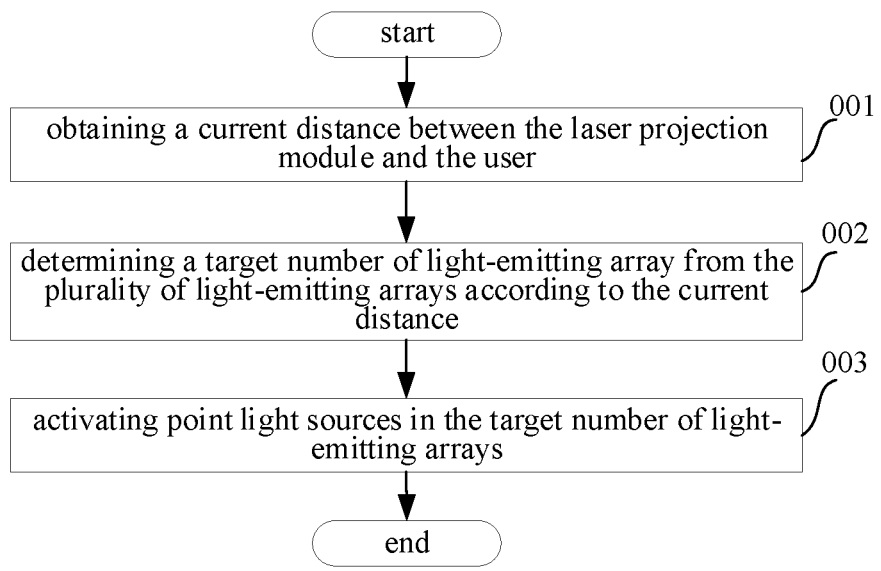
FIG. 2 is a schematic flowchart illustrating a method for controlling a laser projection module according to some implementations of the present disclosure.

As illustrated in FIG. 2, the present disclosure provides a method for controlling a laser projection module 100. The laser projection module 100 includes a laser emitter 10. The laser emitter 10 in the laser projection module 100 includes a plurality of point light sources 101. The plurality of the point light sources 101 are grouped to form a plurality of light-emitting arrays 111. The plurality of the light-emitting arrays 111 may be controlled independently. The method may include the following.

At block 001, a current distance between the laser projection module 100 and a user is obtained.

At block 002, a target number of light-emitting arrays are determined from the plurality of light-emitting arrays 111 according to the current distance.

At block 003, point light sources 101 in the target number of light-emitting arrays 111 are activated.

It may be understood that, when the laser projection module 100 is activated, generally all of the point light sources 101 are activated. When the user is too closed to the laser projection module 100, eyes of the user may be harmed by high energy of the laser light emitted by the laser emitter 10 after all of the point light sources 101 are activated. With the method for controlling the laser projection module 100, the device 80 for controlling the laser projection module 100, the depth camera 1000 and the electronic device 3000 according to implementations of the present disclosure, the point light sources 101 in the laser projection module 100 are arranged into light-emitting arrays 111 that each may be controlled independently. In this manner, according to the current distance detected, the point light sources 101 in the target number of the light-emitting arrays 111 corresponding to the current distance may be activated, to avoid a case that the eyes of the user are harmed by high energy of the laser light emitted by the laser emitter 10 after all the point light sources 101 are activated, when the user is located too closed to the laser projection module 100.

As illustrated in FIG. 2, in some implementations, the plurality of the light-emitting arrays 111 include a plurality of fan-shaped arrays 111, and the plurality of the fan-shaped arrays 111 collectively form a circular array 11. The plurality of the fan-shaped arrays 111 are controlled independently.

Figure 3:
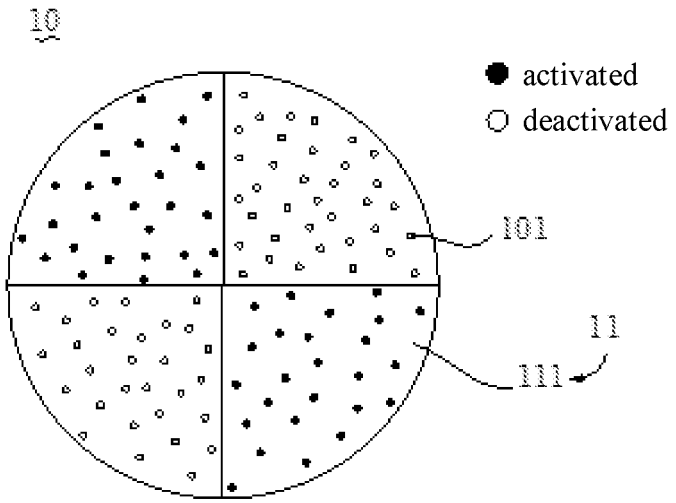
FIG. 3 is a schematic diagram illustrating that laser emitters included in the laser projection module include multiple fan-shaped arrays according to some implementations of the present disclosure.
Figure 4:
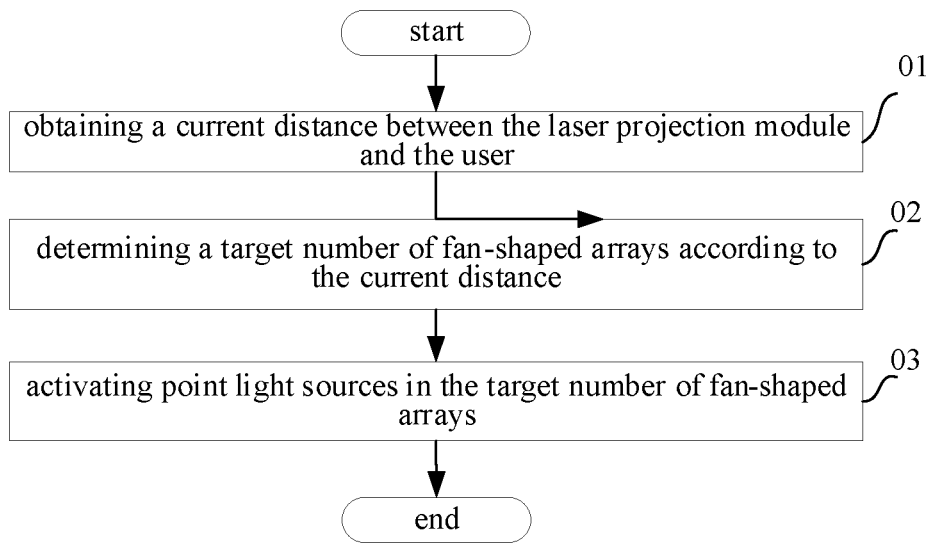
FIG. 4 is a schematic flowchart illustrating a method for controlling a laser projection module according to some implementations of the present disclosure.

As illustrated in FIG. 3, the block 001 of obtaining the current distance between the laser projection module 100 and the user includes a block 01 of obtaining the current distance between the laser projection module 100 and the user. The block 002 of determining the target number of light-emitting arrays from the plurality of light-emitting arrays 111 according to the current distance includes a block 02 of determining a target number of fan-shaped arrays from the plurality of fan-shaped arrays 111 according to the current distance. The block 003 of activating the point light sources 101 in the target number of light-emitting arrays 111 includes a block 03 of activating the point light sources 101 in the target number of fan-shaped arrays 111.

It may be understood that, an optical effective region of the collimating element 20 is generally circular. In this case, when the plurality of the point light sources 101 are arranged as a rectangle, it is required that a diameter of the optical effective region is larger than a length of a diagonal of the rectangle defined by the point light sources 101, such that the circular optical effective region may cover all of the point light sources 101 arranged as the rectangle. However, this will waste some spaces of the circular optical effective region. By arranging the plurality of point light sources 101 to from the plurality of fan-shaped arrays 111 such that the plurality of-shaped fan arrays 111 collectively form a circular array 11, a shape of the laser emitter 10 may be matched to the circular optical effective region of the collimating element 20, thereby making full use of the circular optical effective region.

As illustrated in FIG. 5, in some implementations, the plurality of light-emitting arrays 111 include a plurality of sub-arrays 111. The plurality of sub-arrays 111 form a circular array 11. The plurality of sub-arrays 111 include a circular sub-array 113 and an annular sub-array 112. The number of the circular sub-array 113 is one, and the number of the annular sub-array 112 is one or more. The plurality of sub-arrays 111 may be controlled independently.

Figure 6:
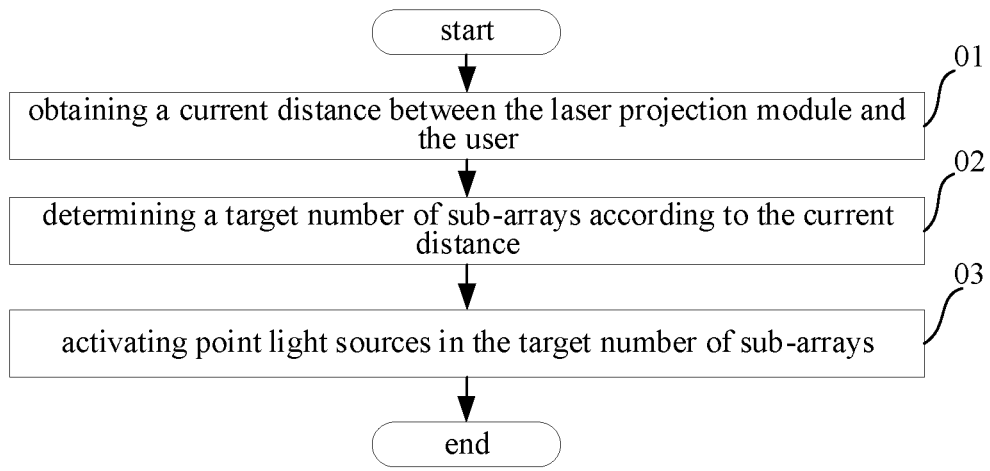
FIG. 6 is a schematic flowchart illustrating a method for controlling a laser projection module according to some implementations of the present disclosure.

As illustrated in FIG. 6, the block 001 of obtaining the current distance between the laser projection module 100 and the user includes a block 01 of obtaining the current distance between the laser projection module 100 and the user. The block 002 of determining the target number of light-emitting arrays from the plurality of light-emitting arrays 111 according to the current distance includes a block 02 of determining the target number of sub-arrays 111 from the plurality of sub-arrays 111 according to the current distance. The block 003 of activating the point light sources 101 in the target number of light-emitting arrays 111 includes a block 03 of activating the point light sources 101 in the target number of sub-arrays 111.

It may be understood that, an optical effective region of the collimating element 20 is generally circular. In this case, when the plurality of the point light sources 101 are arranged as a rectangle, it is required that a diameter of the optical effective region is larger than a length of a diagonal of the rectangle defined by the point light sources 101, such that the circular optical effective region may cover all of the point light sources 101 arranged as the rectangle. However, this will waste some spaces of the circular optical effective region. By arranging the plurality of the point light sources 101 into the plurality of sub-arrays 111 such that the plurality of the sub-arrays 111 form the circular array 11, a shape of the laser emitter 10 may be matched to the shape of the circular optical effective region of the collimating element 20, thereby making full use of the circular optical effective area.

Figure 7:
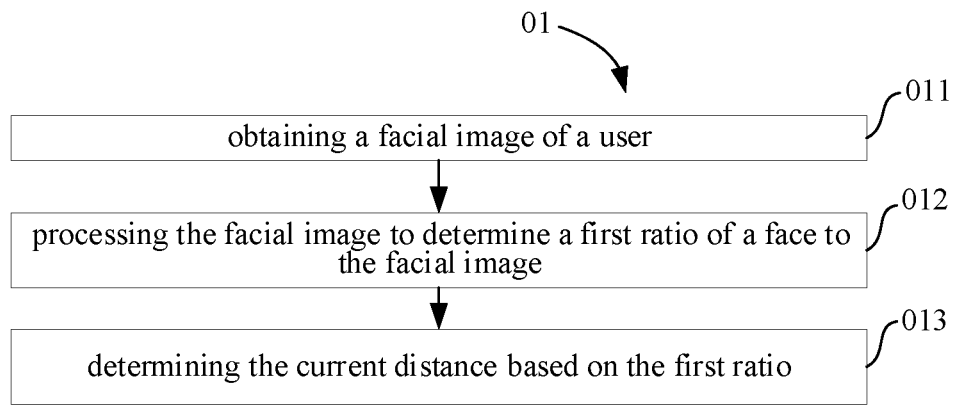
FIG. 7 is a schematic flowchart illustrating a method for controlling a laser projection module according to some implementations of the present disclosure.

As illustrated in FIG. 7, in some implementations, when the plurality of light-emitting arrays 111 include a plurality of the fan-shaped arrays 111 as illustrated in FIG. 3, or the plurality of light-emitting arrays 111 including a plurality of sub-arrays 111 which includes a circular sub-arrays 113 and an annular sub-array 112 as illustrated in FIG. 5, the block 01 of obtaining the current distance between the laser projection module 100 and the user includes the following.

At block 011, a facial image of the user is obtained.

At block 012, the facial image is processed to determine a first ratio of a face of the user to the facial image.

At block 013, the current distance is determined based on the first ratio.

In detail, a face region and a background region may be first divided in the facial image by extracting and analyzing feature points of the face. The first ratio may be obtained by calculating a ratio of the number of pixels in the face region to the number of pixels in the facial image. It may be understood that, when the first ratio is relatively large, it is indicated that the user is closed to the image collector 200. That is, the user is closed to the laser projection module 100, and the current distance is small. Therefore, it is required that the point light sources 101 in a small target number of the light-emitting arrays 111 (fan-shaped arrays 111 or sub-arrays 111) are activated by the laser projection module 100 to avoid a case that the projected laser light is too strong to burn the user. When the first ratio is relatively small, it is indicated that the user is far away from the image collector 200. That is, the user is far away from the laser projection module 100, and the current distance is large. It is required that the laser projection module 100 projects the laser light with large power, such that the laser pattern rejected by the user, after the laser pattern is projected onto the user, still has appropriate intensity to form a depth image. In this case, it is required that the point light sources 101 in a large target number of the light-emitting arrays 111 (fan-shaped arrays 111 or sub-arrays 111) are activated by the laser projection module 100. In an example, when a plurality of faces are included in a single facial image, a region occupied by a face with a largest area among the plurality of the faces may be selected as the face region to calculate the first ratio, while regions occupied by other faces are used as a part of the background region.

A calibration may be performed on the current distance and the first ratio in advance. In detail, the user is directed to photograph the facial image at a preset current distance. A calibration ratio corresponding to the facial image may be calculated. A correspondence between the current distance and the calibration ratio may be stored, such that the current distance may be calculated according to an actual first ratio in subsequent use. For example, the user is directed to obtain the facial image at the current distance of 30 cm, the calibration ratio corresponding to the facial image may be calculated as 45%. In an actual measurement, when the first ratio is calculated as R, based on a triangle similarity principle, it may be derived that $$\sqrt{\frac{R}{45\%}} = \frac{D}{30\text{ cm}},$$

where D is the actual current distance calculated based on the actually measured first ratio R. In this way, the first ratio of the face region to the facial image can objectively reflect the current distance between the laser projection module 100 and the user.

Figure 8:
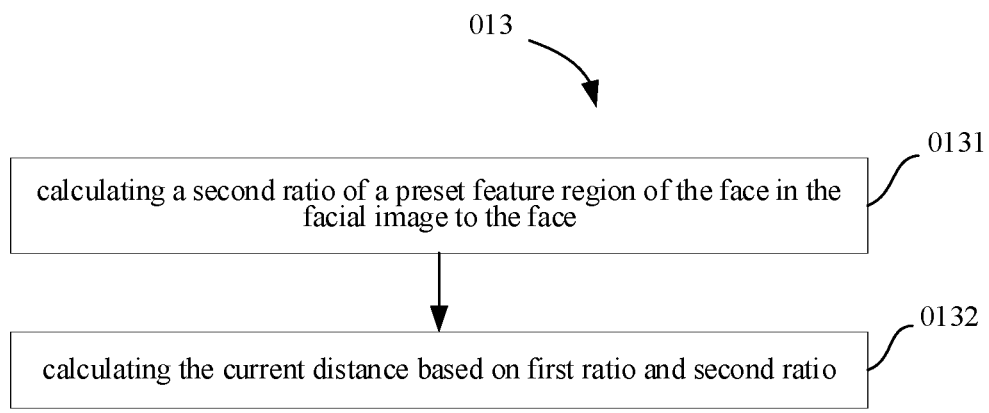
FIG. 8 is a schematic flowchart illustrating a method for controlling a laser projection module according to some implementations of the present disclosure.

As illustrated in FIG. 8, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including the a circular sub-array 113 and an annular sub-array 112 as illustrated in FIG. 5, the block 013 of determining the current distance based on the first ratio, may include the following.

At block 0131, a second ratio of a preset feature region of the face in the facial image to the face is calculated.

At block 0132, the current distance is calculated based on the first ratio and the second ratio. It may be understood that sizes of the faces vary with users, so that the first ratios of the faces to the facial images captured at a same distance are different for different users. The second ratio is a ratio of the preset feature region of the face to the face. The preset feature region may be determined by selecting a feature region with a small difference degree among different individuals. For example, the preset feature region may be a distance between eyes of the user. When the second ratio is relatively large, it is indicated that the face of the user is relatively small. The current distance calculated based on the first ratio is large. When the second ratio is relatively small, it is indicated that the face of the user is relatively large. The current distance calculated based on the first ratio is small. In actual usages, a relationship among the first ratio, the second ratio and the current distance may be calibrated in advance. In detail, the user may be directed to obtain the facial image at a preset current distance. A first calibration ratio and a second calibration ratio corresponding to the facial image may be calculated. The correspondence among the preset current distance, the first calibration ratio and the second calibration ratio may be stored, so as to calculate the current distance based on an actual first ratio and an actual second ratio in subsequent uses. For example, the user may be directed to obtain a facial image at a current distance of 25 cm. The first calibration ratio corresponding to the facial image is calculated as 50%, and the second calibration ratio corresponding to the facial image is calculated as 10%. In actual measurements, when the first ratio is calculated as R1 and the second ratio is calculated as R2, based on the triangle similarity principle, it may be derived that $$\sqrt{\frac{R1}{50\%}} = \frac{D1}{25\text{ cm}},$$

where D1 is an initial current distance calculated based on an actually measured first ratio R1. A calibrated current distance D2 may be calculated based on an equation $$\frac{D1}{10\%} = \frac{D2}{R2}$$

and an actually measured second ratio R2. D2 may be considered as a final current distance. In this way, the calculation of the current distance based on the first ratio and the second ratio takes individual differences among users into account, and thus the current distance may be obtained objectively.

In some examples, the current distance may be corrected based on a correction value. The correction value relates to an age of the user, a decision whether the user wears glasses, and a second ratio of a preset feature region of the face in the facial image to the face.

Figure 9:
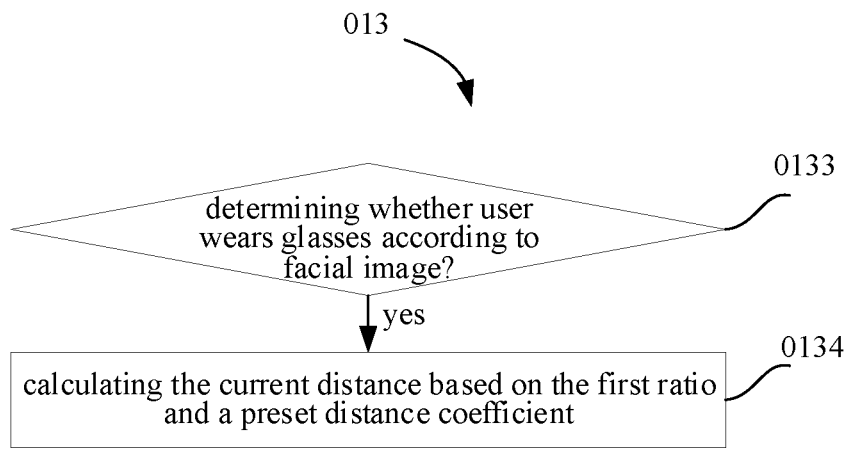
FIG. 9 is a schematic flowchart illustrating a method for controlling a laser projection module according to some implementations of the present disclosure.

As illustrated in FIG. 9, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-array 113 and an annular sub-array 112 as illustrated in FIG. 5, the block 013 of determining the current distance based on the first ratio may include the following.

At block 0133, it is determined whether the user wears glasses according to the facial image.

At block 0134, when the user wears glasses, the current distance is calculated based on the first ratio and a preset distance coefficient.

It may be understood that whether the user wears glasses may be used to characterize a health condition of the eyes of the user. In detail, when the user wears glasses, it may be indicated that the eyes of the user are suffered from related eye diseases or have poor eyesight. When laser light is projected to a user wearing glasses, the point light sources 101 in a small number of light-emitting arrays 111 (fan-shaped arrays 111 or sub-arrays 111) are required to be activated, such that energy of the laser light projected by the laser projection module 100 is small to prevent the eyes of the user from being harmed. The preset distance coefficient may be between 0 and 1, such as 0.6, 0.78, 0.82 and 0.95. For example, after an initial current distance is calculated based on the first ratio, or a calibrated current distance is calculated based on the first ratio and the second ratio, the initial current distance or the calibrated current distance may be multiplied by a distance coefficient to obtain the final current distance. The target number may be determined according to the final current distance. In this manner, it is possible to prevent the user suffering from eye diseases or having poor eyesight from being harmed by excessive power of the emitted laser light.

Further, the distance coefficient may be unfixed. For example, the distance coefficient may be automatically adjusted according to intensity of visible light or intensity of infrared light in ambient. When the facial image captured by the imager 200 is an infrared image, an average value of intensity of infrared light of all pixels of the facial image may be calculated. Different average values correspond to different distance coefficients. The larger the average value, the smaller the distance coefficient, and the smaller the average value, the larger the distance coefficient.

Figure 10:
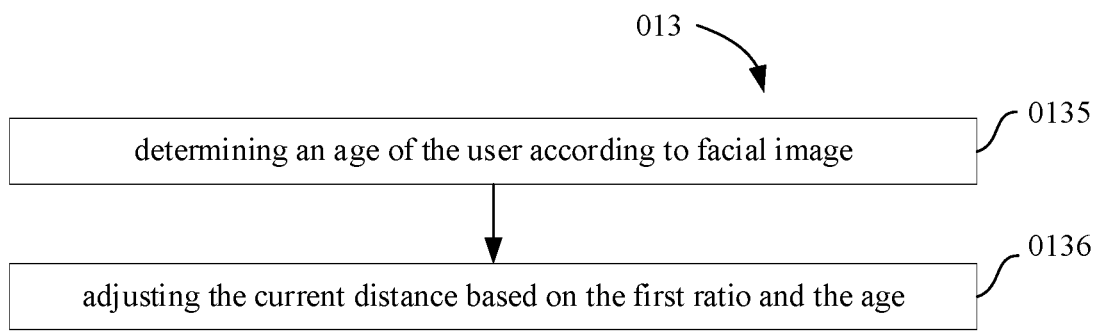
FIG. 10 is a schematic flowchart illustrating a method for controlling a laser projection module according to some implementations of the present disclosure.

As illustrated in FIG. 10, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-arrays 113 and an annular sub-array 112 as illustrated in FIG. 5, the block 013 of determining the current distance based on the first ratio may include the following.

At block 0135, an age of the user is determined according to the facial image.

At block 0136, the current distance is adjusted based on the first ratio and the age of the user.

People of different ages have different tolerances to infrared laser light. For example, children and the elderly are more likely to be burnt by laser light. The laser light that may be tolerable by adults may be harmful to children. In this implementation, the age of the user may be determined based on an amount, a distribution and an area of feature points of facial wrinkles extracted from the facial image. For example, the age of the user may be determined based on the number of wrinkles around the eyes extracted, and may be further determined in combination with the number of wrinkles at the forehead of the user. After the age of the user is determined, a proportional coefficient may be obtained according to the age of the user. In detail, a correspondence between the age and the proportional coefficient may be searched for from a lookup table. For example, when the age is about under 15, the proportional coefficient may be about 0.6. When the age is about between 15 and 20, the proportional coefficient may be about 0.8. When the age is about between 20 and 45, the proportional coefficient may be about 1.0. When the age is about 45 or more, the proportional coefficient may be about 0.8. After the proportional coefficient is obtained, the initial current distance calculated based on the first ratio may be multiplied by the proportional coefficient, or the calibrated current distance calculated based on the first ratio and the second ratio may be multiplied by the proportional coefficient, to obtain the final current distance. The target number may be determined for the light-emitting arrays 111 (the fan-shaped arrays 111 or the sub-arrays 111) according to the final current distance. In this way, it is possible to avoid a case that power of the projected laser light is too large to harm the children or the elderly.

Figure 11:
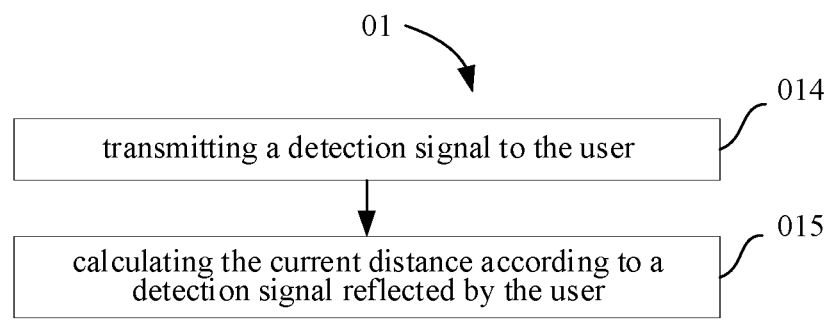
FIG. 11 is a schematic flowchart illustrating a method for controlling a laser projection module according to some implementations of the present disclosure.

As illustrated in FIG. 11, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-array 113 and an annular sub-array 112 as illustrated in FIG. 5, the block 01 of acquiring the current distance between the laser projection module 100 and the user may include the following.

At block 014, a detection signal is transmitted to the user.

At block 015, the current distance is calculated according to a detection signal reflected by the user.

The detection signal may be generated by an ultrasonic generator or the like. With the detection signal generated by the ultrasonic generator and a reflected signal of the user, the current distance may be calculated.

In detail, the point light sources 101 in a single light-emitting array 111 (the fan-shaped arrays 111 or the sub-arrays 111) may be activated. That is, only the point light sources 101 in the single light-emitting array 111 (the fan-shaped arrays 111 or the sub-arrays 111) are activated to emit the laser light. The imager 200 in the depth camera 1000 receives the reflected laser light to obtain a laser pattern. An offset value of each pixel point in the laser pattern against a corresponding pixel point in a predetermined pattern may be calculated using an image matching algorithm. The depth image corresponding to the laser pattern may be determined based on the offset value, such that the current distance between the laser projection module 100 and the user may be roughly determined. Since the point light sources 101 in the single light-emitting array 111 (the fan-shaped arrays 111 or the sub-arrays 111) are activated to detect the current distance, energy of the laser light emitted by the laser projection module 100 may be low and may not cause harm to the eyes of the user. After the current distance between the user and the laser projection module 100 is roughly measured, the target number of light-emitting arrays 111 (the fan-shaped arrays 111 or the sub-arrays 111) may be determined according to the current distance. Therefore, the laser light emitted by the laser projection module 100 may meet an accuracy requirement of estimating the depth image without causing any harm to the eyes of the user.

In some implementations, when the plurality of the light-emitting arrays 111 include a plurality of the fan-shaped arrays 111, or the plurality of the light-emitting arrays 111 are a plurality of sub-arrays 111 including a circular sub-array 113 and an annular sub-array 112, and when the current distance is with a first distance range, the point light sources 101 in a first target number of light-emitting arrays 111 (the fan-shaped arrays 111 or the sub-arrays 111) may be activated. When the current distance is within a second distance range, the point light sources 101 in a second target number of light-emitting arrays 111 (the fan-shaped arrays 111 or the sub-arrays 111) may be activated. When the current distance is within a third distance range, the point light sources 101 in a third target number of light-emitting arrays 111 (the fan-shaped arrays 111 or the sub-arrays 111) may be activated. The second distance range may be between the first distance range and the third distance range. That is, an upper limit of the first distance range is less than or equal to a lower limit of the second distance range. In addition, an upper limit of the second distance range is less than a lower upper of the third distance range. The second target number is greater than the first target number. In addition, the second target number is less than the third target number.

In detail, for example, the point light sources 101 included in the laser projection module 100 are grouped to form six light-emitting arrays 111 (the fan-shaped arrays 111 or the sub-arrays 111). The first distance range may be about [0 cm, 15 cm]. The second distance range may be about (15 cm, 40 cm]. The third distance range may be about (40 cm, ∞). The first target number may be about 2. The second target number may be about 4. The third target number may be about 6. When it is detected that the current distance is within the range of [0 cm, 15 cm], the point light sources 101 in two light-emitting arrays 111 (the fan-shaped arrays 111 or the sub-arrays 111) may be activated. When it is detected that the current distance is within the range of (15 cm, 40 cm], the point light sources 101 in four light-emitting arrays 111 (the fan-shaped arrays 111 or the sub-arrays 111) may be activated. When it is detected that the current distance is within the range of (40 cm, ∞), the point light sources 101 in six light-emitting arrays 111 (the fan-shaped arrays 111 or the sub-arrays 111) may be activated. That is, as the current distance increases, the value of the target number increases and the number of activated point light sources 101 in the light-emitting arrays 111 (the fan-shaped arrays 111 or the sub-arrays 111) increase. Thus, when the current distance between the user and the laser projection module 100 is small, the point light sources 101 in a small number of the light-emitting arrays 111 (the fan-shaped arrays 111 or the sub-arrays 111) may be activated, so as to prevent the eyes of the user from being harmed by excessively large energy of the laser light emitted by the laser projection module 100. When the current distance between the user and the laser projection module 100 is large, the point light sources 101 in a large number of light-emitting arrays 111 (the fan-shaped arrays 111 or the sub-arrays 111) may be activated, such that the imager 200 may receive the laser light of sufficient energy. Therefore, an acquisition accuracy of the depth image is high.

Figure 12:
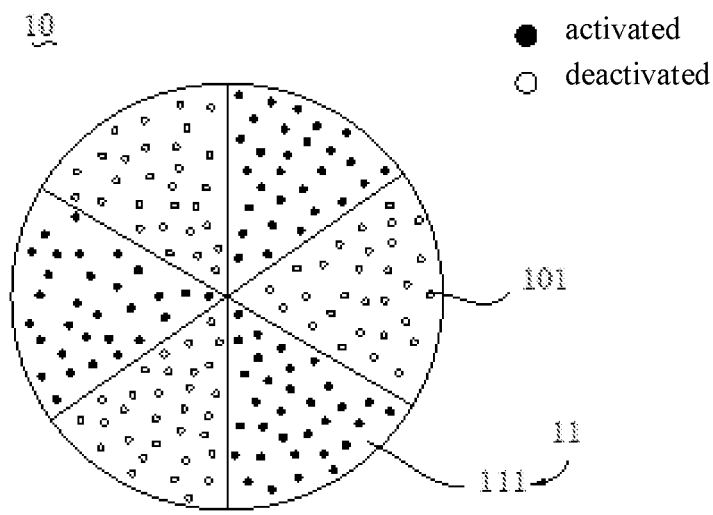
FIG. 12 is a schematic diagram illustrating that a laser emitter included in a laser projection module includes multiple fan-shaped arrays according to some implementations of the present disclosure.
Figure 13:
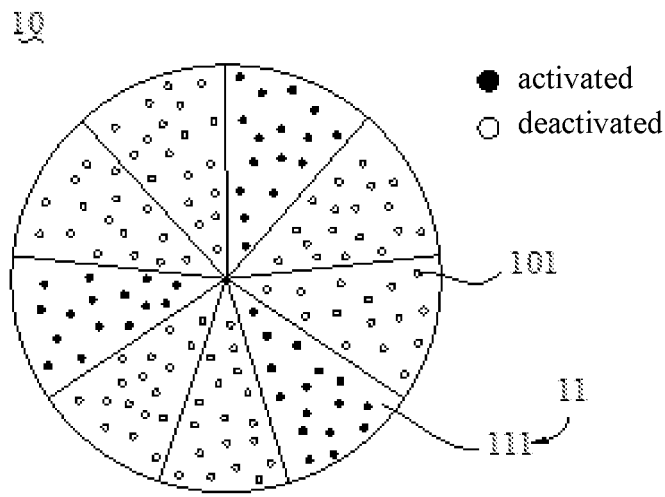
FIG. 13 is a schematic diagram illustrating that a laser emitter included in a laser projection module includes multiple fan-shaped arrays according to some implementations of the present disclosure.

In some implementations, when the plurality of the light-emitting arrays 111 include a plurality of fan-shaped arrays 111, and when the number of the fan-shaped arrays 111 is equal to or greater than 2 and the target number is equal to or greater than 2, and the number of the fan-shaped arrays 111 is a multiple of the target number, the plurality of the fan-shaped arrays 111 activated are centrosymmetrically with respect to the center of the laser emitter 10. For example, as illustrated in FIG. 3, the number of the fan-shaped arrays 111 is 4, the target number is 2, where 4 is a multiple of 2, and the two fan-shaped arrays 111 activated are centrosymmetrically with respect to the center of the laser emitter 10. As another example, as illustrated in FIG. 12, the number of the fan-shaped arrays 111 is 6, the target number is 3. A deactivated fan-shaped array exists between every two adjacent activated fan-shaped arrays 111, and the three activated fan-shaped arrays 111 are centrosymmetrically with respect to the center of the laser emitter 10. As still another example, as illustrated in FIG. 13, the number of the fan-shaped arrays 111 is 9, and the target number is 3. Therefore, two activated fan-shaped arrays exist between every two adjacent activated fan-shaped arrays 111. The three activated fan-shaped arrays 111 are centrosymmetrically with respect to the center of the laser emitter 10. In this way, the activated fan-shaped arrays 111 are centrosymmetrically with respect to the center. The laser light emitted by the point light sources 101, after passing the collimating element 20 and the diffractive element 30, covers a large field of view, and is evenly distributed, which is advantageous for improving the acquisition accuracy of the depth image.

Figure 14:
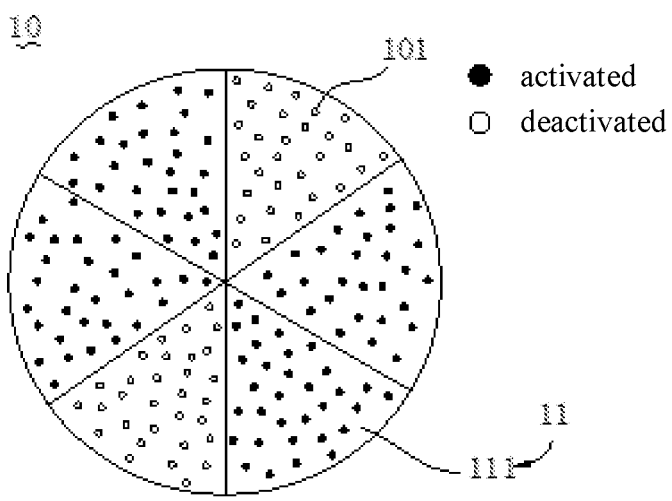
FIG. 14 is a schematic diagram illustrating that a laser emitter included in a laser projection module includes multiple fan-shaped arrays according to some implementations of the present disclosure.
Figure 15:
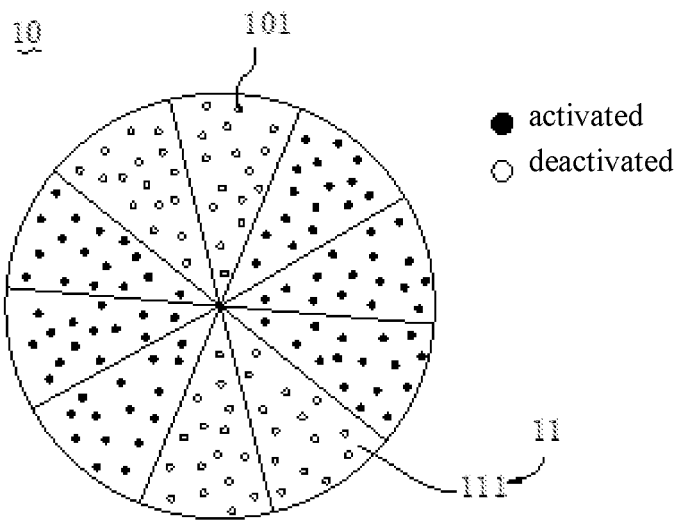
FIG. 15 is a schematic diagram illustrating that a laser emitter included in a laser projection module includes multiple fan-shaped arrays according to some implementations of the present disclosure.
Figure 16:
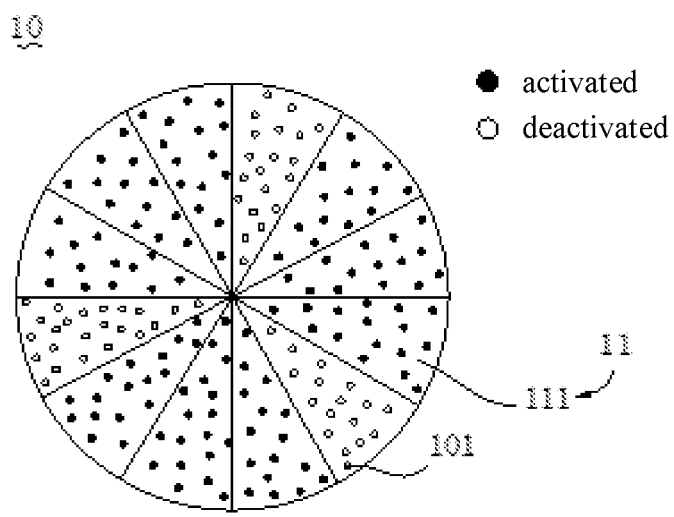
FIG. 16 is a schematic diagram illustrating that a laser emitter included in a laser projection module includes multiple fan-shaped arrays according to some implementations of the present disclosure.

In some implementations, when the plurality of the light-emitting arrays 111 include a plurality of fan-shaped arrays 111, when the number of the fan-shaped arrays 111 is equal to or greater than two and the target number is plural, and the number of the fan-shaped arrays 111 is even, the activated fan-shaped arrays 111 are centrosymmetrically with respect to the center of the laser emitter 10. For example, as illustrated in FIG. 14, the number of the fan-shaped arrays 111 is 6, the target number is 4, and two of the four activated fan-shaped arrays 111 are adjacent to each other, and the remaining two fan-shaped arrays 111 are adjacent to each other. The four activated fan-shaped arrays 111 are centrosymmetrically with respect to the center of the laser emitter 10. As another example, as illustrated in FIG. 15, the number of the fan-shaped arrays 111 is 10, the target number is 6, three of the six activated fan-shaped arrays 111 are adjacent to each other, and the remaining three fan-shaped arrays 111 are adjacent to each other. The six activated fan-shaped arrays 111 are centrosymmetrically with respect to the center of the laser emitter 10. As still another example, as illustrated in FIG. 16, the number of the fan-shaped arrays 111 is 12, the target number is 9, and three of the nine activated fan-shaped arrays 111 are adjacent to each other, another three fan-shaped arrays 111 are adjacent to each other, and remaining three fan-shaped arrays 111 are adjacent to each other. The nine activated fan-shaped arrays 111 are centrosymmetrically with respect to the center of the laser emitter 10. Therefore, the activated fan-shaped arrays 111 are centrosymmetrically with respect to the center. After passing the collimating element 20 and the diffractive element 30, the laser light emitted by the point light sources 101 covers a large field of view and is distributed evenly, which is advantageous for improving the acquisition accuracy of the depth image.

In some implementations, when the plurality of the light-emitting arrays 111 include a plurality of sub-arrays 111 and the plurality of the sub-arrays 111 includes a circular sub-array 113 and an annular sub-array 112, when the point light sources 101 in the circular sub-array 113 and of the annular sub-array 112 are simultaneously activated, the point light sources 101 in the sub-arrays 111 which is far from the center of the circular array 11 has high power.

In detail, as illustrated in FIG. 5, for example, the circular array 120 of the laser emitter 10 includes four sub-arrays 111, e.g., one circular sub-array 113 and three annular sub-arrays 112. The three annular sub-arrays 112 are sequentially arranged along a direction away from the center of the circular array 11. The three annular sub-arrays 112 sequentially arranged are numbered as A, B, and C respectively. When the point light sources 101 in the circular sub-array 113 and the point light sources 101 in the annular sub-array 112 numbered as A are simultaneously activated, a voltage ($U_{circle}$) applied to the point light sources 101 in the circular sub-array 113 is less than the voltage ($U_A$) applied to the point light sources 101 in the annular sub-array 112 numbered as A, i.e., $U_{circle} < U_A$. When the point light sources 101 in the circular sub-array 113, the point light sources 101 in the annular sub-arrays 112 numbered as A and B are simultaneously activated, the voltage ($U_{circle}$) applied to the point light sources 101 in the circular sub-array 113 is less than the voltage ($U_A$) applied to the point light sources 101 in the annular sub-array 112 numbered as A, and the voltage ($U_A$) applied to the point light sources 101 in the annular sub-array 112 numbered as A is less than the voltage ($U_B$) applied to the point light sources 101 in the annular sub-array 112 numbered as B, i.e., $U_{circle} < U_A < U_B$. When the point light sources 101 in the circular sub-array 113, the point light sources 101 in the ring-shaped sub-arrays 112 numbered as A, B and C are simultaneously activated, the voltage ($U_{circle}$) applied to the point light sources 101 in the circular sub-array 113 is less than the voltage ($U_A$) applied to the point light sources 101 in the annular sub-array 112 numbered as A, and the voltage ($U_A$) applied to the point light sources 101 in the annular sub-array 112 numbered as A is less than the voltage ($U_B$) applied to the point light sources 101 in the annular sub-array 112 numbered as B, and the voltage ($U_B$) applied to the annular sub-array 112 numbered as B is less than that ($U_C$) applied to the point light sources 101 in the annular sub-array 112 numbered as C, i.e., $U_{circle} < U_A < U_B < U_C$. Therefore, the power of the sub-array 111 far from the center of the circular array 11 is high, thereby ensuring even distribution of the laser light after the laser light passes through the diffractive element 30.

It may be understood that, when the power of the sub-array 111 that is closed to the center of the circular array 11 is high, more laser light emitted by the laser emitter 10 may be gathered at the center of the circular array 11. When the above-mentioned laser light passes through the diffractive element 30, a portion of the above-mentioned laser light may directly exit from the diffractive element 30, without being diffracted due to limited diffraction ability of the diffractive element 30. The directly exiting laser light may not be suffered from the diffraction and attenuation effect of the diffractive element 30. Therefore, the energy of the directly exiting laser light is large, which is very likely to cause harm to the eyes of the user. As a result, reducing the power of the sub-array 111 closed to the center of the circular array 11 may avoid excessive laser light gathered at the center of the circular array 11 and prevent the eyes of the user from being harmed by the laser light directly exiting without being diffracted.

In some implementations, when the plurality of the light-emitting arrays 111 include a plurality of sub-arrays 111, and the plurality of the sub-arrays 111 include a circular sub-array 113 and an annular sub-array 112, when the current distance is within the first distance range, the point light sources 101 in the annular sub-array 112 may be activated. When the current distance is within the second distance range, the point light sources 101 in the circular sub-array 113 may be activated. An upper limit of the first distance range is less than a lower limit of the second distance range.

In detail, it is assumed that the circular array 11 of the laser emitter includes two sub-arrays 111, e.g., a circular sub-array 113 and an annular sub-array 112. The first distance range is [0 cm, 15 cm]. The second distance range is (15 cm, 40 cm]. The third distance range is (40 cm, ∞). The first target number is 1. The second target number is 1. The third target number is 2. When the current distance is within the first distance range, the point light sources 101 in the annular sub-array 112 may be activated. When the current distance is within the second distance range, the point light sources 101 in the circular sub-array 113 may be activated. When the current distance is within the third distance range, the point light sources 101 in the annular sub-array 112 and the point light sources 101 in the circular sub-array 113 may be activated. When the point light sources 101 in the annular sub-array 112 or the point light sources 101 in the circular sub-array 113 are activated, the voltage applied to the point light sources 101 in the annular sub-array 112 may be equal to the voltage applied to the point light sources 101 in the circular sub-array 113. Thus, as the current distance increases, the sub-arrays 111 may be activated in the following manner. The annular sub-array 112 and the circular sub-array 113 may be sequentially activated in a direction closing to the center of the circular array 11. In this way, it is possible to avoid a case that the eyes of the user are harmed by excessive energy of the laser light that directly exits without being diffracted by the diffractive element 30, by activating the circular sub-array 113 or the annular sub-array 112 closed to the center of the circular array 11 when the current distance is small.

Figure 17:
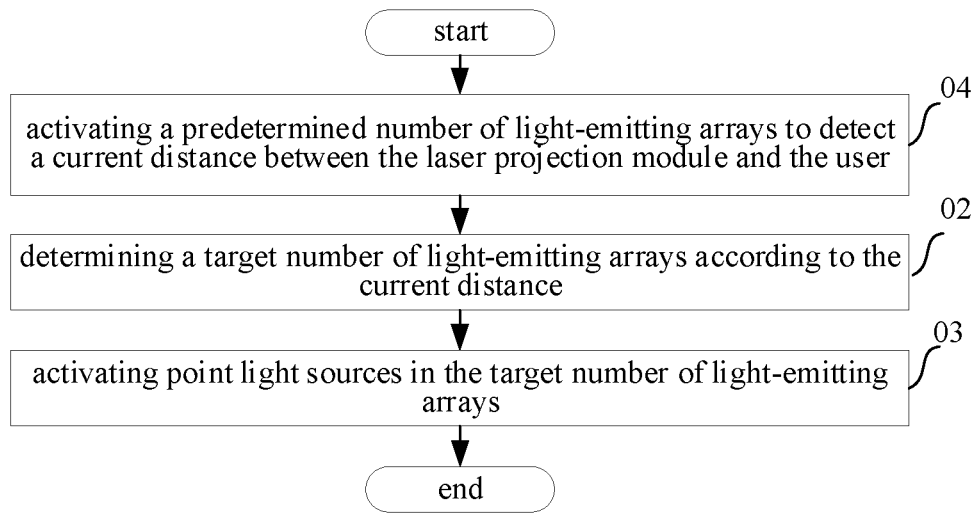
FIG. 17 is a schematic flowchart illustrating a method for controlling a laser projection module according to some implementations of the present disclosure.

As illustrated in FIG. 17, in some implementations, the block 001 of obtaining a current distance between the laser projection module 100 and the user may include the following.

At block 04, the current distance between the user and the laser projection module 100 is detected by activating a predetermined number of the light-emitting arrays 111.

Figure 18:
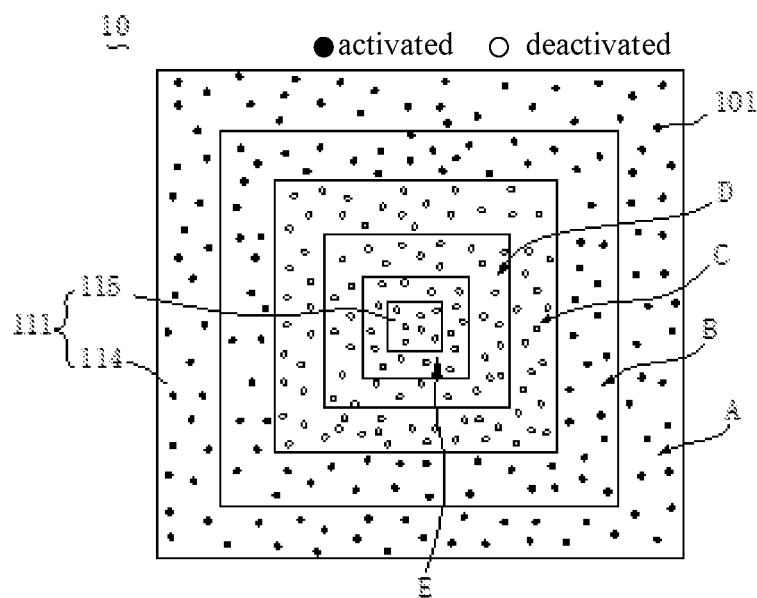
FIG. 18 is a schematic diagram illustrating that laser emitters included in a laser projection module include a square sub-arrays and multiple ring-shaped arrays according to some implementations of the present disclosure.

The laser light projected by the laser projection module 100 may be infrared. The current distance between the user and the laser projection module 100 is unknown during the operation of the laser projection module 100. Therefore, when the energy of the infrared laser is improperly controlled, the energy of the infrared laser may be too large to cause damage to the eyes of the user. The point light sources 101 in the laser emitter 10 may be grouped to form a plurality of independently controllable light-emitting arrays 111. When the laser projection module 100 is in operation, a predetermined number of the light-emitting arrays 111 may be activated to detect the current distance between the user and the laser projection module 100, as illustrated in FIG. 18. After the current distance is determined, the target number of the light-emitting arrays 111 to be activated may be determined according to the current distance. In this manner, it may avoid affecting the acquisition accuracy of the depth image caused by low brightness of a laser pattern captured by the imager 200, since a small number of the light-emitting arrays 111 are activated. In addition, it may avoid a problem that the energy of the exiting laser light is excessive to harm the eyes of the user, since an excessive number of the light-emitting arrays 111 are activated.

The predetermined number of the light-emitting arrays 111 activated during the operation of the laser projection module 100 may be derived from empirical data. Before the laser projection module 100 is in operation, by activating the predetermined number of the light-emitting arrays 111, the current distance between the user and the laser projection module 100 may be measured without causing damage to the eyes of the user. The predetermined number of the light-emitting arrays 111 depends on the type of the electronic device 3000 and the total number of the light-emitting arrays 111. For example, when the electronic device 3000 is a phone, the laser projection module 100 is often used to assist in obtaining a 3D facial image for face recognition and unlocking. The current distance between the user and the laser projection module 100 is generally small. Assuming that the total number of the light-emitting arrays 111 is 6, the predetermined number may be 2. When the total number of the light-emitting arrays 111 is 12, the predetermined number may be 3. Therefore, the current distance between the user and the laser projection module 100 may be roughly measured, and a problem of excessive laser energy may be avoided. As another example, when the electronic device 3000 is a somatosensory gaming device, the current distance between the user and the laser projection module 100 may be generally large. Assuming that the total number of the light-emitting arrays 111 is 24, the predetermined number may be 8. Thus, the current distance between the user and the laser projection module 100 may be roughly measured, and a problem of excessive laser energy may be avoided.

Figure 19:
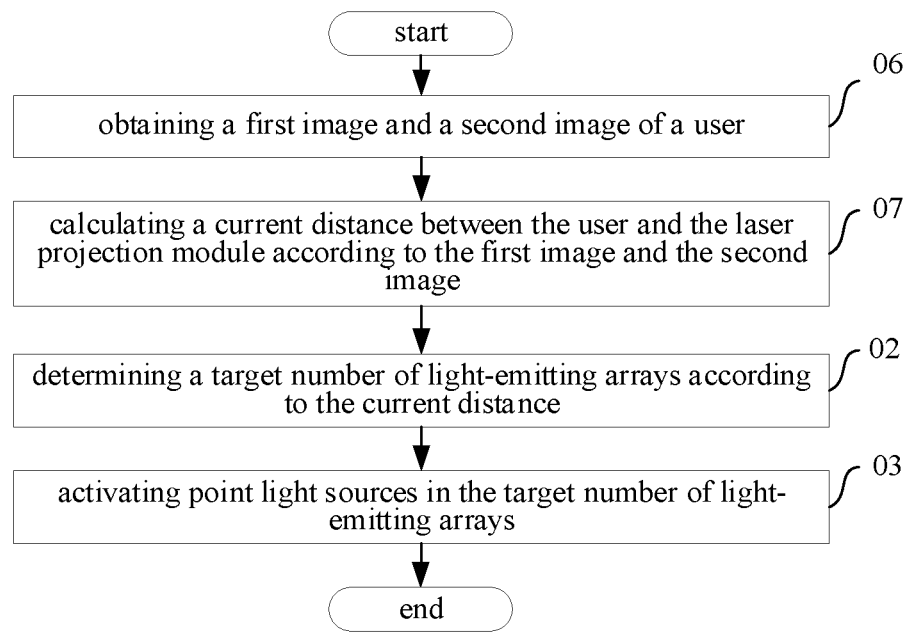
FIG. 19 is a schematic flowchart illustrating a method for controlling a laser projection module according to some implementations of the present disclosure.

As illustrated in FIG. 19, in some implementations, the block 0111 of obtaining the current distance between the laser projection module 100 ad the user may include the following.

At block 06, a first image and a second image are obtained.

At block 07, the current distance between the user and the laser projection module 100 are calculated according to the first image and the second image.

The laser pattern from the laser projection module 100 may be projected by the user in space. The laser pattern reflected by the user may be captured by the imager 200. The depth image of the user may be acquired according to the laser pattern and a reference laser pattern. The laser light emitted by the laser projection module 100 may be infrared. The current distance between the user and the laser projection module 100 may be unknown when the laser projection module 100 is in operation. Therefore, when the energy of the infrared light is improperly controlled, the energy of the infrared light may be excessive, causing harm to the eyes of the user. The point light sources 101 in the laser emitter 10 may be grouped into a plurality of independently controlled laser-emitting arrays 11. The first image and the second image of the user may be obtained when the laser projection module 100 is in operation to calculate the current distance between the user and the laser projection module 100. After the current distance is determined, a target number of the light-emitting arrays 111 to be activated may be determined according to the current distance. Therefore, it may avoid affecting the acquisition accuracy of the depth image due to low brightness of the laser pattern captured by the imager 200, since the number of the light-emitting arrays activated is small. In addition, it may avoid that the number of the light-emitting arrays 111 is too large, such that the eyes of the user may be harmed by the excessive energy of the exiting laser light.

The first image may be an infrared image, while the second image may be a visible image (RGB image). The first image may be a visible image, while the second image may be an infrared image. The visible image may be captured by a visible capturing module 4000. The infrared image may be captured by the imager 200 of the depth camera 1000. Both of the first image and the second image may be visible images, and thus the electronic device 3000 may include two visible capturing module 4000. Taking the first image being an infrared image and the second image being a visible image as an example, when the laser projection module 100 is in operation, the imager 200 and the visible capturing module 4000 may be activated. The imager 200 may be configured to capture the first image, while the visible capturing module 4000 may be configured to capture the second image. The first image may be read from the imager 200 and the second image may be read from the visible capturing module 4000. The first image and the second image may be a pair of images. The current distance may be calculated based on the pair of images. In detail, a binocular image correction may be performed on the first image and the second image. Distortion cancellation and row alignment may be performed by the processor 300 on the first image and the second image respectively according to a monocular parameter (focal length, imaging original point, distortion parameter) and a binocular relative positional relation (rotation matrix and a displacement vector) obtained by calibrating the imager 200 and the visible capturing module 4000 in advance, such that the first image and the second image are strictly aligned to each other by row. Therefore, for each point on the first image, since the first image and the second image are strictly aligned to each other by row, when it needs to find a point corresponding to that point from the second image, it only needs to find a point corresponding to that point from a row corresponding to that row where that point is located from the second image, without finding the corresponding point from all rows of the second image. Therefore, calculation of matching a point of the first image with a corresponding point of the second image is relatively fast. After matching each point of the first image to the corresponding point of the second image, the depth information at a corresponding position may be calculated according to each pair of matched points, such that the depth image may be finally generated. The face may be recognized from the first image and the second image, and to determine the depth image corresponding to the face according to matching relation between the depth image and the first image or the second image. Since the face generally occupies a plurality of pixel points, a medium value or an average value of a plurality of pieces of depth information corresponding to the plurality of pixels may be determined as the final current distance.

Certainly, for further reducing the processing time, the user may be taken as a point target. A distance of the laser projection module 100 and the point target may be determined as the current distance. In some examples, a certain portion of the user may be determined as the point target, and the distance between the laser projection module 100 and the point target may be determined as the current distance. For example, the face of the user is the point target, the distance between the laser projection module 100 and the face of the user may be determined as the current distance. In detail, the face may be recognized from the first image and the second image. Pixel matching may be performed on the face of the first image and the face of the second image to perform a calculation of depth information, such that the current distance may be calculated based on the depth information.

A target number of the light-emitting arrays 111 to be activated may be determined from the plurality of light-emitting arrays 111 according to the current distance, after the current distance is obtained in block 04 or after the current distance is obtained in block 06 and in block 07. The laser projection module 100 may be controlled to activate the target number of light-emitting arrays 111, to further obtain a more accurate depth image. For example, when the electronic device 3000 is a phone and the total number of the light-emitting arrays 111 is 6, when it is detected that the current distance is large, such as within a range from 15 to 20 cm, it may be determined that the target number is about 3 or 4 according to the current distance. That is, the point light sources 101 in about 3 or 4 light-emitting arrays may be activated. When it is measured that the current distance is small, such as within a range from 5 to 10 cm, it may be determined that the target number is 1 according to the current distance. That is, the point light sources 101 in the one light-emitting array may be activated.

Figure 20:
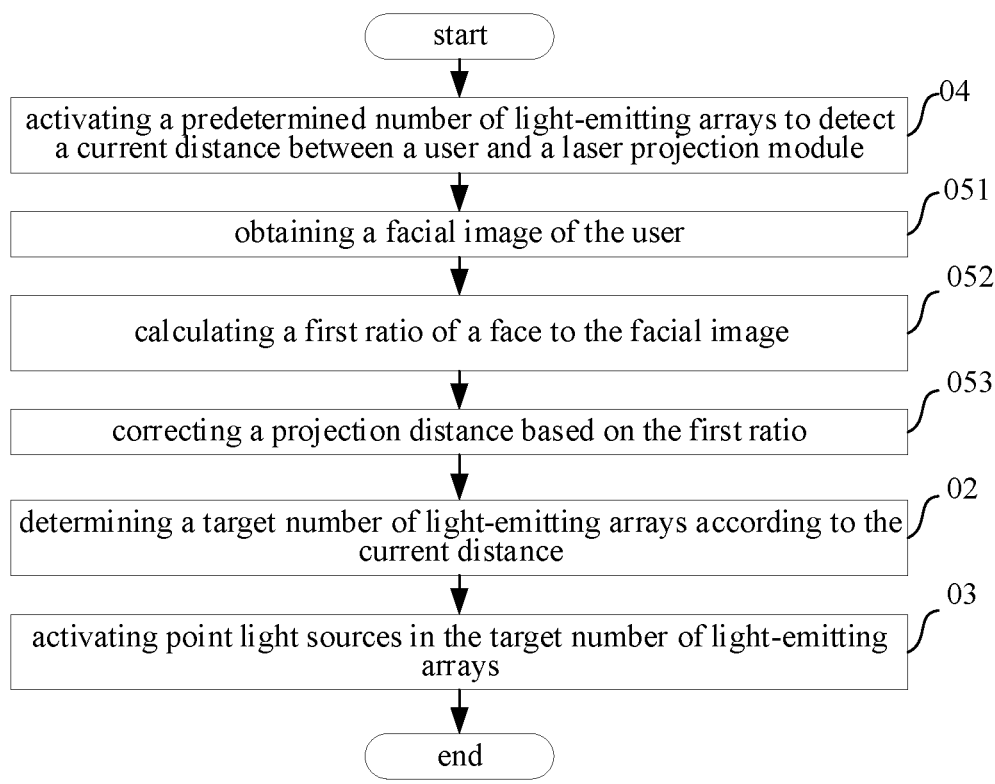
FIG. 20 is a schematic flowchart illustrating a method for controlling a laser projection module according to some implementations of the present disclosure.
Figure 21:
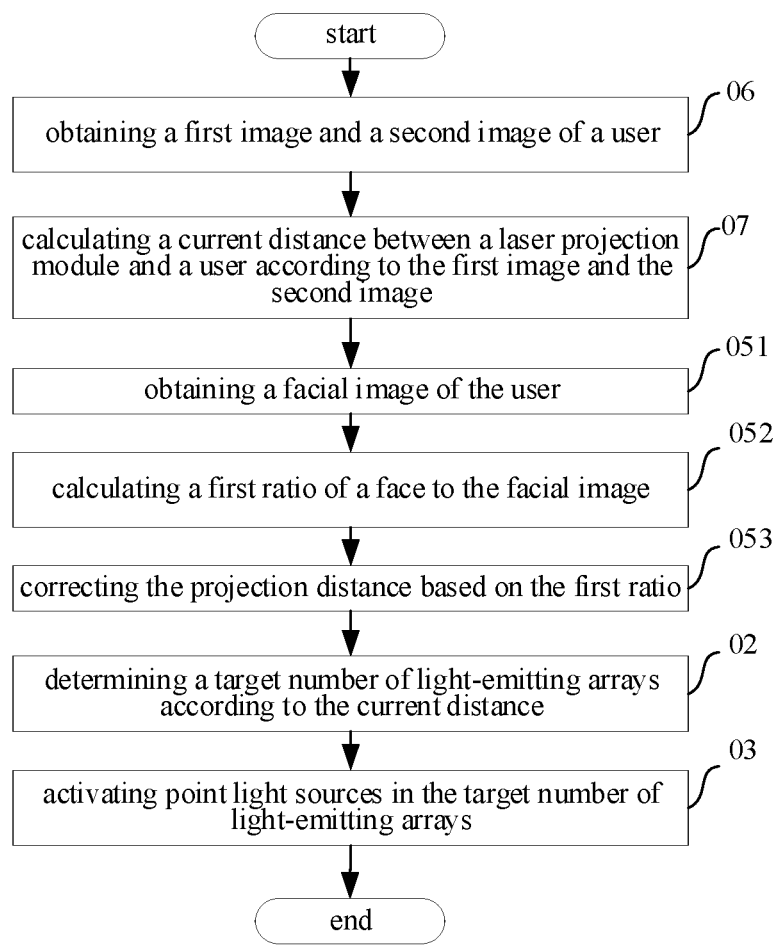
FIG. 21 is a schematic flowchart illustrating a method for controlling a laser projection module according to some implementations of the present disclosure.

In some implementations, the method further includes a block of correcting the current distance (i.e., block 05) after the block 04 of activating the target number of light-emitting arrays 111 to detect the current distance between the user and the laser projection module 100 as illustrated in FIG. 20, or after the block 07 of calculating the current distance between the user and the laser projection module 100 according to the first image and the second image as illustrated in FIG. 21. After the current distance is obtained, the current distance may be corrected by a correction value. The correction value relates to a first ratio of a face to the facial image, a second ratio of a preset feature region of the face in the facial image to the face, an age of the user and a decision whether the user wears glasses.

In detail, the method may include the following.

At block 051, a facial image of the user is obtained.

At block 052, a first ratio of a face to the facial image is calculated.

At block 053, the current distance is corrected based on the first ratio.

In detail, a face region and a background region may be divided in the facial image by extracting and analyzing feature points of the face. The first ratio may be obtained by calculating a ratio of the number of pixels included in the face region to the number of pixels included in the facial image. It may be understood that, when the first ratio is large, it is indicated that the user is closed to the image collector 200. That is, the user is closed to the laser projection module 100, and the current distance is small. Therefore, it needs to activate the point light sources 101 in a small target number of the light-emitting arrays 111 by the laser projection module 100 to prevent the user from being burned by strong laser light emitted. In addition, when the first ratio is small, it is indicated that the user is far away from the image collector 200, and the current distance is large. The laser projection module 100 needs to emit the laser light with large power, such that the laser pattern reflected by the user after being projected on the user still has appropriate intensity to form a depth image. Therefore, it needs to activate the point light sources 101 in a large target number of the light-emitting arrays 111 by the laser projection module 100. In an example, when a plurality of faces are included in a single facial image, the region occupied by the face having the largest area among the plurality of faces may be selected as the face region to calculate the first ratio, and regions occupied by other faces may be a part of the background region.

A correspondence between the current distance and the first ratio may be calibrated in advance. In detail, the user is directed to obtain a facial image at a preset current distance. A calibration ratio corresponding to the facial image may be calculated. A correspondence between the current distance and the calibration ratio may be stored, such that the current distance may be calculated according to an actual first ratio in subsequent uses. For example, the user is directed to obtain a facial image at a current distance of 30 cm. The calibration ratio corresponding to the facial image may be calculated to be 45%. In actual measurements, when the first ratio is calculated as R, based on triangle similarity principle, it may be derived that $$\sqrt{\frac{R}{45\%}} = \frac{D}{30 \text{ cm}},$$

where D denotes an actual current distance calculated according to the actual measured first ratio R. In this way, according to the first ratio of the face to the facial image, the current distance between the laser projection module 100 and the user may be objectively reflected.

Figure 22:
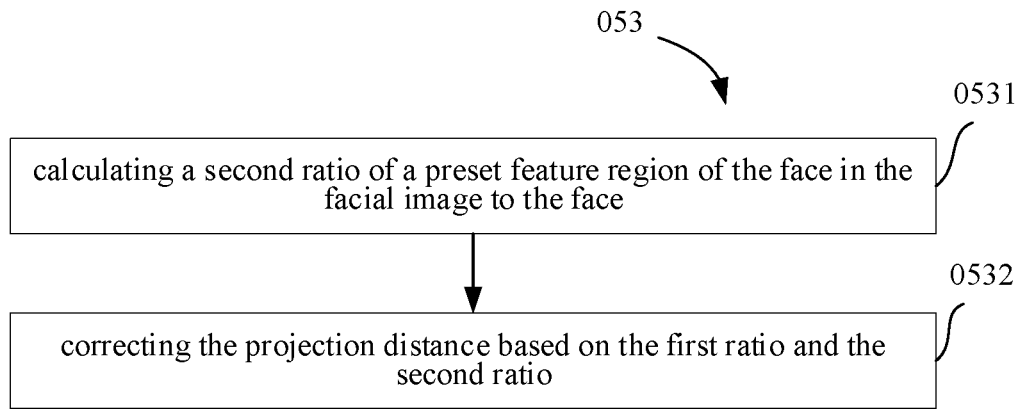
FIG. 22 is a schematic flowchart illustrating a method for controlling a laser projection module according to some implementations of the present disclosure.

As illustrated in FIG. 22, in some implementations, the block 053 of correcting the current distance based on the first ratio may include the following.

At block 0531, a second ratio of a preset feature region of the face in the facial image to the face is calculated.

At block 0532, the current distance is corrected based on the first ratio and the second ratio.

It may be understood that, sizes of the faces vary with users, so that the first ratios of the faces to the facial images captured at a same distance are different for different users. The second ratio is a ratio of the preset feature region of the face to the face. The preset feature region may be determined by selecting a feature region with a small difference degree among different individuals. For example, the preset feature region may be a distance between eyes of the user. When the second ratio is large, it is indicated that the face of the user is small. The current distance calculated based on the first ratio may be large. When the second ratio is small, it is indicated that the face of the user is large. The current distance calculated based on the first ratio may be small. In actual use, a relationship among the first ratio, the second ratio and the current distance may be calibrated in advance. In detail, the user may be directed to obtain the facial image at a preset current distance. A first calibration ratio and a second calibration ratio corresponding to the facial image may be calculated. The correspondence among the preset current distance, the first calibration ratio and the second calibration ratio may be stored, so as to calculate the current distance based on an actual first ratio and an actual second ratio in subsequent use. For example, the user is directed to obtain a facial image at a current distance of 25 cm. The first calibration ratio corresponding to the facial image is calculated to be 50%, and the second calibration ratio corresponding to the facial image is calculated to be 10%. In actual measurements, when the first ratio is calculated as R1 and the second ratio is calculated as R2, according to a triangle similarity principle, it may be derived that $$\sqrt{\frac{R1}{50\%}} = \frac{D1}{25 \text{ cm}},$$

where D1 denotes an initial current distance calculated based on an actually measured first ratio R1. A calibrated current distance D2 may be calculated based on an equation $$\frac{D1}{10\%} = \frac{D2}{R2}$$

and an actually measured second ratio R2. D2 may be considered as a final current distance. In this way, the calculation of the current distance based on the first ratio and the second ratio takes individual differences among users into account, and thus an objective current distance may be obtained.

Figure 23:
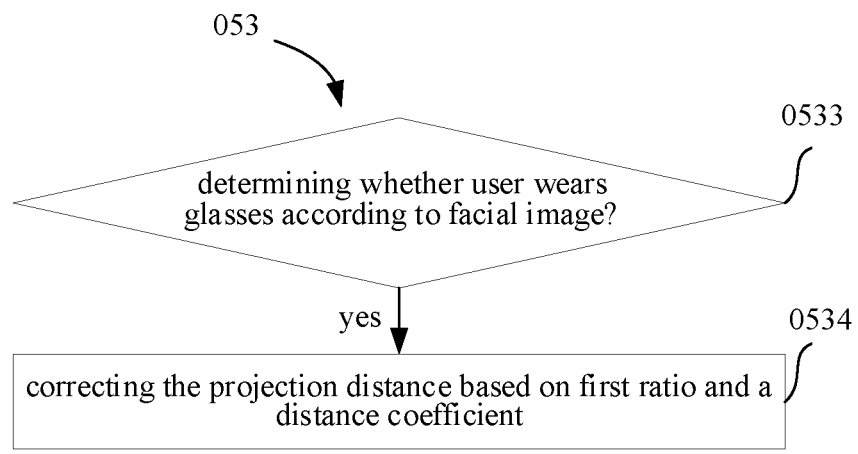
FIG. 23 is a schematic flowchart illustrating a method for controlling a laser projection module according to some implementation of the present disclosure.

As illustrated in FIG. 23, in some implementations, the block 053 of correcting the current distance based on the first ratio may include the following.

At block 0533, it is determined whether the user wears glasses according to the facial image.

At block 0534, when the user wears glasses, the current distance is corrected based on the first ratio and a distance coefficient.

It may be understood that, whether the user wears glasses may be used to characterize a health condition of the eyes of the user. In detail, when the user wears glasses, it is indicated that the eyes of the user are suffered from related eye diseases or have poor eyesight. When laser light is projected onto a user wearing glasses, the point light sources 101 in a small number of light-emitting arrays 111 are required to be activated, such that energy of the laser light emitted by the laser projection module 100 is small to prevent the eyes of the user from being harmed. The preset distance coefficient may be between 0 and 1, such as 0.6, 0.78, 0.82 and 0.95. For example, after an initial current distance is calculated based on the first ratio, or a calibrated current distance is calculated based on the first ratio and the second ratio, the initial current distance or the calibrated current distance may be multiplied by the distance coefficient to obtain a final current distance. The final current distance may be used to determine the target number. In this manner, it is possible to prevent a user suffering from eye diseases or having poor eyesight from being harmed by excessive power of the emitted laser light.

Further, the distance coefficient may be not fixed. For example, the distance coefficient may be automatically adjusted according to intensity of visible light or intensity of infrared light in ambient. When the facial image captured by the imager 200 is an infrared image, an average value of intensity of infrared light of all pixels of the facial image may be calculated. Different average values correspond to different distance coefficients. The larger the average value, the smaller the distance coefficient, and the smaller the average value, the larger the distance coefficient.

Figure 24:
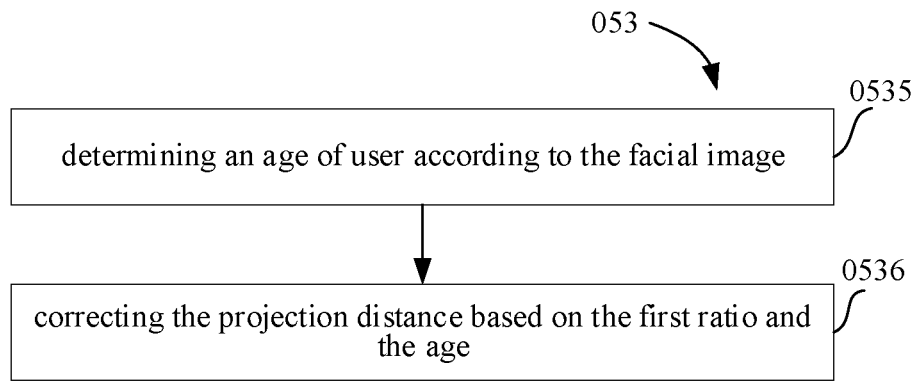
FIG. 24 is a schematic flowchart illustrating a method for controlling a laser projection module according to some implementations of the present disclosure.

As illustrated in FIG. 24, in some implementations, the block 053 of correcting the current distance based on the first ratio may include the following.

At block 0535, an age of the user is determined according to the facial image.

At block 0536, the current distance is corrected based on the first ratio and the age.

People of different ages have different tolerances to infrared lasers. For example, children and the elderly are more likely to be burnt by laser light. The Laser light that are tolerable for adults may be harmful to children. In this implementation, the age of the user may be determined based on an amount, a distribution and an area of the feature points of the facial wrinkles extracted from the facial image. For example, the age of the user may be determined based on the amount of the wrinkles around the eyes extracted, and may be further determined in combination with the number of wrinkles at forehead of the user. After the age of the user is determined, a proportional coefficient may be obtained according to the age of the user. In detail, a correspondence between the age and the proportional coefficient may be searched for from a lookup table. For example, when the age is about under 15, the proportional coefficient may be about 0.6. When the age is about between 15 and 20, the proportional coefficient may be about 0.8. When the age is about between 20 and 45, the proportional coefficient may be about 1.0. When the age is about 45 or more, the proportional coefficient may be about 0.8. After the proportional coefficient is obtained, the initial current distance calculated based on the first ratio or the calibrated current distance calculated based on the first ratio and the second ratio may be multiplied by the proportional coefficient, to obtain a final current distance. The target number may be determined for the light-emitting arrays 111 according to the current distance. In this way, it is possible to avoid a case that power of the projected laser light is too large to harm the children or the elderly.

In some implementations, after the block of obtaining the current distance or the blocks 06 and 07 of obtaining the current distance, when the current distance is within a first distance range, the point light sources 101 in a first target number of light-emitting arrays 111 may be activated. When the current distance is within a second distance range, the point light sources 101 in a second target number of light-emitting arrays 111 may be activated. When the current distance is within a third distance range, the point light sources 101 in a third target number of light-emitting arrays 111 may be activated. The second distance range is between the first distance range and the third distance range. That is, an upper limit of the first distance range is less than or equal to a lower limit of the second distance range, and an upper limit of the second distance range is less than an upper limit of the third distance range. The second target number is greater than the first target number and is less than the third target number.

In detail, for example, the point light sources 101 included in the laser projection module 100 are grouped to form six light-emitting arrays 111. The first distance range is about [0 cm, 15 cm]. The second distance interval is about (15 cm, 40 cm]. The third distance interval is about (40 cm, ∞). The first target number is about 2. The second target number is about 4. The third target number is about 6. When it is detected that the current distance is within the range of [0 cm, 15 cm], the point light sources 101 in two light-emitting arrays 111 may be activated. When it is detected that the current distance is within the range of (15 cm, 40 cm], the point light sources 101 in four light-emitting arrays 111 may be activated. When it is detected that the current distance is within the range of (40 cm, ∞), the point light sources 101 in six light-emitting arrays 111 may be activated. That is, as the current distance increases, the value of the target number increases, and the number of the point light sources activated in the light-emitting arrays 111 increases. Thus, when the current distance between the user and the laser projection module 100 is small, the point light sources 101 in a small number of light-emitting arrays 111 may be activated, so as to prevent that energy of the laser light emitted by the laser projection module 100 is excessively large to harm the eyes of the user. When the current distance between the user and the laser projection module 100 is large, the point light sources 101 in a large number of light-emitting arrays 111 may be activated, such that the imager 200 may receive the laser light of sufficient energy. Therefore, an acquisition accuracy of the depth image may be improved.

In some implementations, the plurality of light-emitting arrays 111 are arranged in a ring shape, and the current distance is obtained according to the block 04, or the blocks 06 and 07. Laser light emitted by the point light sources 101 in the light-emitting arrays 111 arranged in the ring shape may cover a wide field of view. Therefore, depth information of more objects in the space may be obtained. The ring shape may be a square ring shape or a circular ring shape.

In some implementations, as the current distance increases, the light-emitting arrays 111 may be activated in the following manner. The light-emitting array 111 far away from the center of the laser emitter 10 may be activated earlier than other light-emitting arrays. For example, as illustrated in FIG. 18, a total number of the light-emitting arrays 111 is 6, and the six light-emitting arrays 111 include five ring-shaped sub-arrays 114 and one rectangle sub-array 115. Along the direction closing the center of the laser emitter 10, the five ring-shaped sub-arrays 114 are arranged sequentially, and numbered as A, B, C, D, and E. When the target number is 2, the point light sources 101 in the ring-shaped sub-array 114 numbered as A and in the ring-shaped sub-array numbered as B may be activated. When the target number is 4, the point light sources 101 in the ring-shaped sub-arrays 114 numbered as A, B, C, and D may be activated. When the target number is 6, the point light sources 101 in the rectangle sub-array 115 and in the ring-shaped sub-arrays 114 numbered as A, B, C, D, and E may be activated. It may be understood that, the diffractive element 30 has limited diffraction power. That is, a part of the laser light emitted by the laser emitter 10 may directly exits without being diffracted. Therefore, the directly exiting laser light may be not suffered from diffraction and attenuation of the diffractive element 30. Energy of the directly exiting laser light may be high and it is likely to cause harm to the eyes of the user. As a result, when the current distance is small, the ring-shaped sub-array 114 away from the center of the laser emitter 10 may be activated earlier than others to avoid a case that the directly exiting laser energy without being diffracted by the diffraction effect of the diffractive element 30 is excessively large to harm the eyes of the user.

Further, in some implementations, when the point light sources 101 in the rectangle sub-array 115 and the point light sources 101 in at least one ring-shaped sub-array 114 are simultaneously activated, the point light sources 101 in the light-emitting array 111 far away from the center of the laser emitter 10 have high power.

Figure 25:
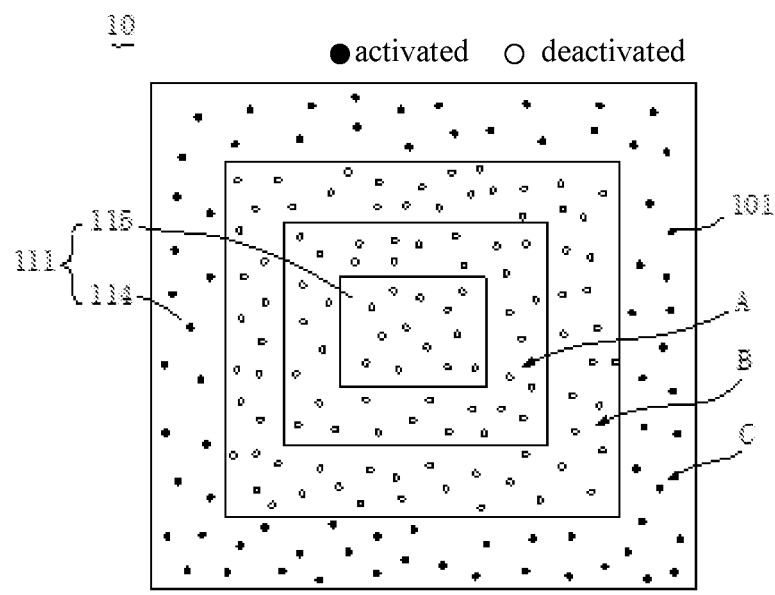
FIG. 25 is a schematic diagram illustrating that a laser emitter included in a laser projection module includes sub-arrays arranged in a rectangle according to some implementations of the present disclosure.

In detail, as illustrated in FIG. 25, for example, the total number of the light-emitting arrays 111 is 4. The four light-emitting arrays 111 include three ring-shaped sub-arrays 114 and one rectangle sub-array 115. The three ring-shaped sub-arrays 114 are sequentially arranged in a direction away from the center of the laser emitter 10. The three ring-shaped sub-arrays 114 sequentially arranged are numbered as A, B, and C respectively. When the point light sources 101 in the ring-shaped sub-array 114 numbered as A and the point light sources in the rectangle sub-array 115 are simultaneously activated, the voltage ($U_{rectangle}$) applied to the point light sources 101 in the rectangle sub-array 115 is less than the voltage ($U_A$) applied to the point light sources 101 in the ring-shaped sub-array 114 numbered as A, i.e., $U_{rectangle}<U_A$. When the point light sources 101 in the rectangle sub-array 115 and in the ring-shaped sub-arrays 114 numbered as A and B are simultaneously activated, the voltage ($U_{rectangle}$) applied to the point light sources 101 in the rectangle sub-array 115 is less than the voltage ($U_A$) applied to the point light sources 101 in the ring-shaped sub-array 114 numbered as A, and the voltage ($U_A$) applied to the point light sources 101 in the ring-shaped sub-array 114 numbered as A is less than the voltage ($U_B$) applied to the point light sources 101 in the ring-shaped sub-array 114 numbered as B, i.e., $U_{rectangle}<U_A<U_B$. When the point light sources 101 in the rectangle sub-array 115 and in the ring-shaped sub-arrays 114 numbered as A, B and C are simultaneously activated, the voltage ($U_{rectangle}$) applied to the point light sources 101 in the rectangle sub-array 115 is less than the voltage ($U_A$) applied to the point light sources 101 in the ring-shaped sub-array 114 numbered as A, and the voltage ($U_A$) applied to the point light sources 101 in the ring-shaped sub-array 114 numbered as A is less than the voltage ($U_B$) applied to the point light sources 101 in the ring-shaped sub-array 114 numbered as B, and the voltage ($U_B$) applied to the point light sources 101 in the ring-shaped sub-array 114 numbered as B is less than the voltage ($U_C$) applied to the point light sources 101 in the ring-shaped sub-array 114 numbered as C, i.e., $U_{rectangle}<U_A<U_B<U_C$. Therefore, the light-emitting sub-array 111 far from the center of the circular array 11 has high power, thereby ensuring even emission of laser light exiting from the diffractive element 30.

Figure 26:
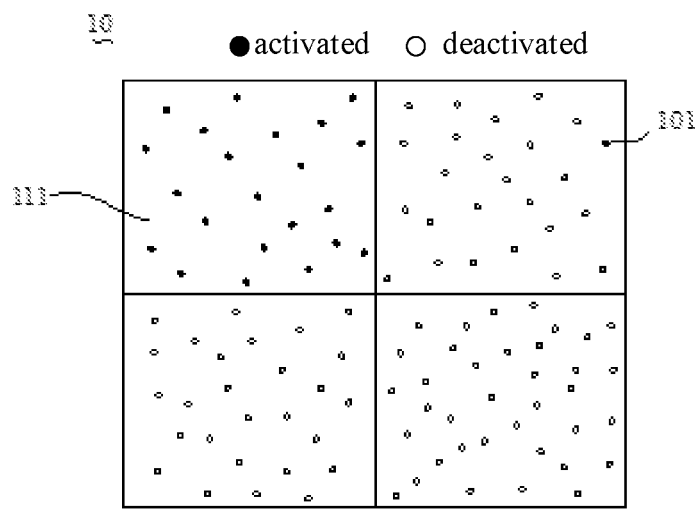
FIG. 26 is a schematic diagram illustrating that a laser emitter included in a laser projection module includes sub-arrays arranged in a rectangle according to some implementations of the present disclosure.
Figure 27:
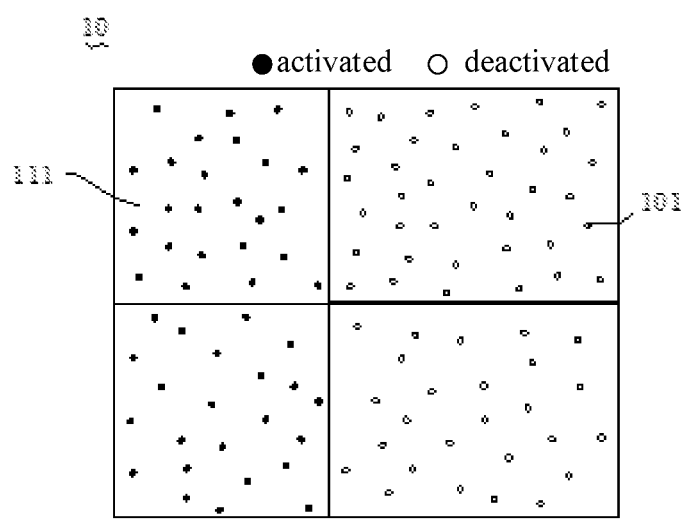
FIG. 27 is a schematic diagram illustrating that a laser emitter included in a laser projection module includes sub-arrays arranged in a rectangle according to some implementations of the present disclosure.
Figure 28:
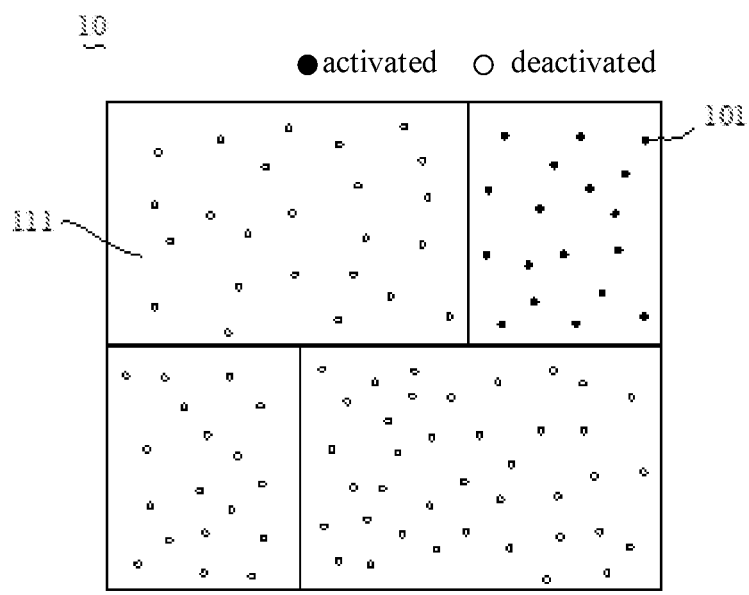
FIG. 28 is a schematic diagram illustrating that a laser emitter included in a laser projection module includes sub-arrays arranged in a rectangle according to some implementations of the present disclosure.

In some implementations, the plurality of the light-emitting arrays 111 are arranged in a rectangle. The current distance may be obtained according to the block 04, or the blocks 06 and 07. In detail, each of the light-emitting arrays 111 are rectangular, and the plurality of the light-emitting arrays 111 having the rectangle shape are combined to form a rectangle. The rectangle formed by the light-emitting arrays 111 is merely a combination of a plurality of rectangular light-emitting arrays 111. Therefore, manufacturing process is relatively simple. As illustrated in FIG. 26, when the light-emitting arrays 111 are arranged in the rectangle, size of each light-emitting array 111 may be equal to each other. In some example, as illustrated in FIG. 27, size of each light-emitting array 111 may be different from each other. Certainly, the plurality of the light-emitting arrays 111 may also be arranged in other manners, as illustrated in FIG. 28.

For example, each of the light-emitting arrays 111 may have a rectangular shape, and the light-emitting arrays 111 collectively form a rectangular shape. The rectangular shape includes a square shape, as illustrated in FIG. 25. As another example, the light-emitting arrays 111 collectively forming a rectangular shape include a rectangular light-emitting array and at least one of ring-shaped light-emitting array, as illustrated in FIG. 25.

The device for controlling a laser projection module will be described below.

Figure 29:
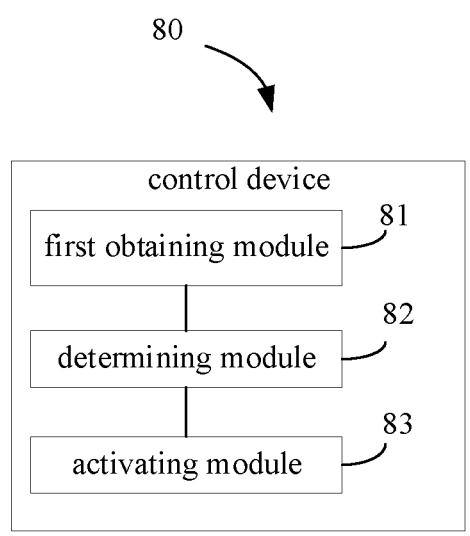
FIG. 29 is a schematic block diagram illustrating a device for controlling a laser projection module according to some implementations of the present disclosure.

As illustrated in FIG. 29, the present disclosure also provides a device 80 for controlling the laser projection module 100 described above. The laser emitter 10 in the laser projection module 100 includes a plurality of point light sources 101. The plurality of the point light sources 101 are grouped to form a plurality of light-emitting arrays 111. The plurality of the light-emitting arrays 111 can be controlled independently. The device 80 includes a first obtaining module 81, a determining module 82 and an activating module 83. The block 001 may be implemented by the first obtaining module 81. The block 002 may be implemented by the determining module 82. The block 003 may be implemented by the activating module 83. That is, the first obtaining module 81 may be configured to obtain a current distance between the laser projection module 100 and a user. The determining module 82 may be configured to determine a target number of light-emitting arrays 111 from the plurality of light-emitting arrays 111 according to the current distance. The activating module 83 may be configured to activate point light sources 101 in the target number of light-emitting arrays 111.

In some implementations, the plurality of the light-emitting arrays 111 include a plurality of fan-shaped arrays 111, and the plurality of the fan-shaped arrays 111 collectively form a circular array 11. The plurality of the fan-shaped arrays 111 are controlled independently. Therefore, the first obtaining module 81 may be configured to obtain the current distance between the laser projection module 100 and the user. The determining module 82 may be configured to determine a target number of fan-shaped arrays from the plurality of fan-shaped arrays 111 according to the current distance. The activating module 83 may be configured to activate the point light sources 101 in the target number of fan-shaped arrays 111.

In some implementations, the plurality of light-emitting arrays 111 include a plurality of sub-arrays 111. The plurality of sub-arrays 111 form a circular array 11. The plurality of sub-arrays 111 include a circular sub-array 113 and an annular sub-array 112. The number of the circular sub-array 113 is one, and the number of the annular sub-array 112 is one or more. Therefore, the first obtaining module 81 may be configured to obtain the current distance between the laser projection module 100 and the user. The determining module 82 may be configured to determine the target number of sub-arrays 111 from the plurality of sub-arrays 111 according to the current distance. The activating module 83 may be configured to activate the point light sources 101 in the target number of sub-arrays 111.

Figure 30:
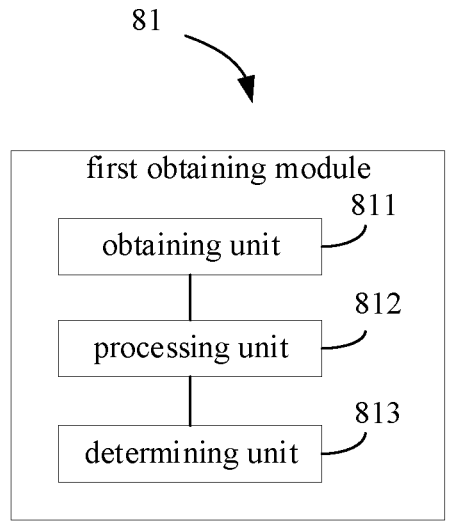
FIG. 30 is a schematic block diagram illustrating a first obtaining module in a device for controlling a laser projection module according to some implementations of the present disclosure.

As illustrated in FIG. 30, in some implementations, when the plurality of light-emitting arrays 111 includes a plurality of fan-shaped arrays 111 as illustrated in FIG. 3, or the plurality of light-emitting arrays 111 are a plurality of sub-arrays 111 including a circular sub-array 113 and an annular sub-array 112 as illustrated in FIG. 5, the first obtaining module 81 may include an obtaining unit 811, a processing unit 812 and a determining unit 813. The block 011 may be implemented by the obtaining unit 811. The block 012 may be implemented by the processing unit 812. The block 013 may be implemented by the determining unit 813. That is, the obtaining unit 811 may be configured to obtain a facial image of the user. The processing unit 812 may be configured to process the facial image to determine a first ratio of a face of the user to the facial image. The determining unit 813 may be configured to determine the current distance based on the first ratio.

Figure 31:
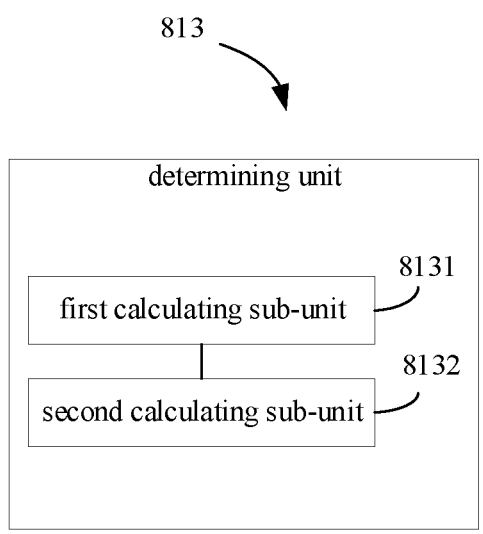
FIG. 31 is a schematic block diagram illustrating a determining unit in a device for controlling a laser projection module according to some implementations of the present disclosure.

As illustrated in FIG. 31, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-array 113 and an annular sub-array 112 as illustrated in FIG. 5, the determining unit 813 includes a first calculating sub-unit 8131 and a second calculating sub-unit 8132. The block 0131 may be implemented by the first calculating sub-unit 8131. The block 0132 may be implemented by the second calculating sub-unit 8132. That is, the first calculating sub-unit 8131 may be configured to calculate a second ratio of a preset feature region of the face in the facial image to the face. The second calculating sub-unit 8132 may be configured to calculate the current distance based on the first ratio and the second ratio.

Figure 32:
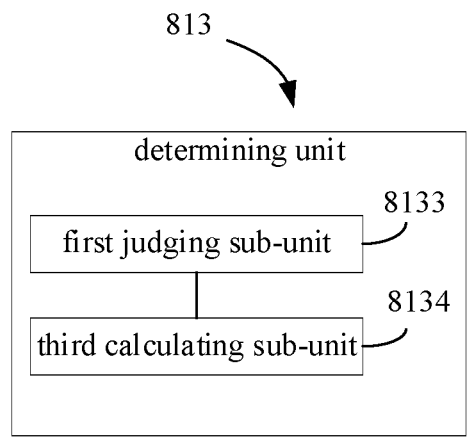
FIG. 32 is a schematic block diagram illustrating a determining unit in a device for controlling a laser projection module according to some implementations of the present disclosure.

As illustrated in FIG. 32, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-array 113 and an annular sub-array 112 as illustrated in FIG. 5, the determining unit 813 includes a first judging sub-unit 8133 and a third calculating sub-unit 8134. The block 0133 may be implemented by the first judging sub-unit 8133. The block 0134 may be implemented by the third calculating sub-unit 8134. That is, the first judging sub-unit 8133 may be configured to determine whether the user wears glasses according to the facial image. The third calculating sub-unit 8134 may be configured to calculate the current distance based on the first ratio and the preset distance coefficient when the user wears glasses.

Figure 33:
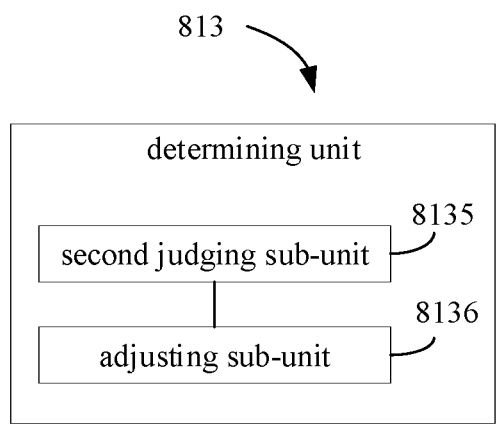
FIG. 33 is a schematic block diagram illustrating a determining unit in a device for controlling a laser projection module according to some implementations of the present disclosure.

As illustrated in FIG. 33, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-array 113 and an annular sub-array 112 as illustrated in FIG. 5, the determining unit 813 may further include a second judging sub-unit 8135 and an adjusting sub-unit 8136. The block 0135 may be implemented by the second judging sub-unit 8135. The block 0136 may be implemented by the adjusting sub-unit 8136. That is, the second judging sub-unit 8135 may be configured to determine the age of the user according to the facial image. The adjusting sub-unit 8136 may be configured to adjust the current distance based on the first ratio and the age of the user.

Figure 34:
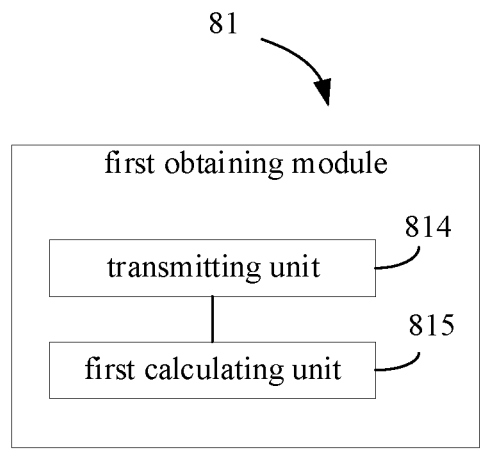
FIG. 34 is a schematic block diagram illustrating a first obtaining module in a device for controlling a laser projection module according to some implementations of the present disclosure.

As illustrated in FIG. 34, in some implementations, when the plurality of light-emitting arrays 111 include a plurality of fan-shaped arrays 111 as illustrated in FIG. 3, or the plurality of light-emitting array 111 are a plurality of sub-arrays 111 including a circuit sub-array 113 and an annular sub-array 112 as illustrated in FIG. 5, the first obtaining module 81 may include a transmitting unit 814 and a first calculating unit 815. The block 014 may be implemented by the transmitting unit 814. The block 015 may be implemented by the first calculating unit 815. That is, the transmitting unit 814 may be configured to transmit a detection signal to the user. The first calculating unit 815 may be configured to calculate the current distance according to a detection signal reflected by the user.

As illustrated in FIG. 29, in some implementations, the block 04 may be implemented by the first obtaining module 81. That is, the first obtaining module 81 may be configured to activate a predetermined number of the light-emitting arrays 111 to detect the current distance between the user and the laser projection module 100. As illustrated in FIG. 18, the predetermined number of light-emitting arrays 111 may be activated to detect the current distance between the user and the laser projection module 100.

As illustrated in FIG. 29, in some implementations, the block 06 and the block 07 may be implemented by the first obtaining module 81. That is, the first obtaining module 81 may be configured to obtain the first image and the second image of the user, and may be configured to calculate the current distance between the user and the laser projection module 100 according to the first image and the second image.

Figure 35:
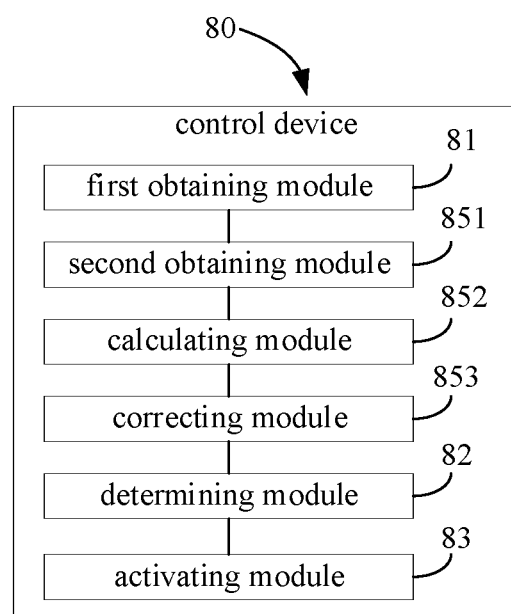
FIG. 35 is a schematic block diagram illustrating a device for controlling a laser projection module according to some implementations of the present disclosure.

As illustrated in FIG. 35, in some implementations, the control device 80 may further include a second obtaining module 851, a calculating module 852 and a correcting module 853. The block 051 may be implemented by the second obtaining module 851. The block 052 may be implemented by the calculating module 852. The block 053 may be implemented by the correcting module 853. That is, the second obtaining module 851 may be configured to obtain a facial image of the user. The calculating module 852 may be configured to calculate a first ratio of a face to the facial image. The correcting module 853 may be configured to correct the current distance based on the first ratio.

Figure 36:
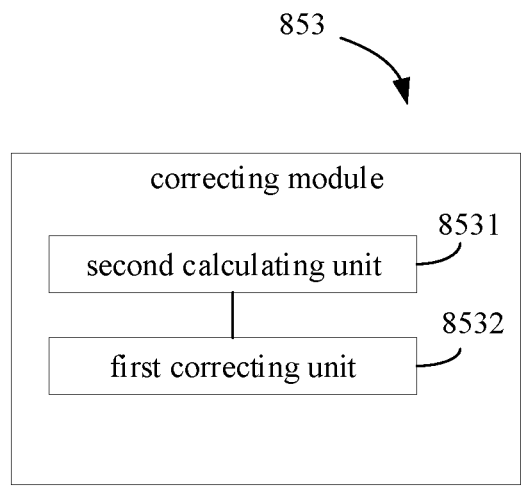
FIG. 36 is a schematic block diagram illustrating a correcting module in a device for controlling a laser projection module according to some implementations of the present disclosure.

As illustrated in FIG. 36, in some implementations, the correcting module 853 may include a second calculating unit 8531 and a first correcting unit 8532. The block 0531 may be implemented by the second calculating unit 8531. The block 0532 may be implemented by the first correcting unit 8532. That is, the second calculating unit 8531 may be configured to calculate a second ratio of a preset feature region of the face in the facial image to the face. The first correcting unit 8532 may be configured to correct the current distance based on the first ratio and the second ratio.

Figure 37:
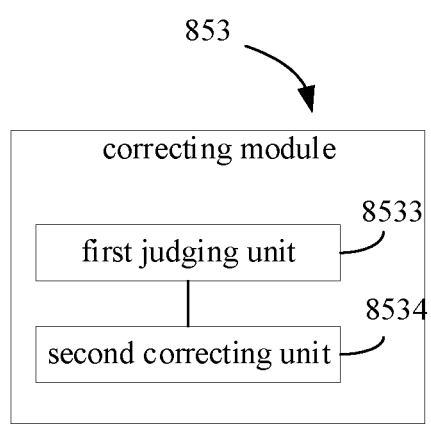
FIG. 37 is a schematic block diagram illustrating a correcting module in a device for controlling a laser projection module according to some implementations of the present disclosure.

As illustrated in FIG. 37, in some implementations, the correcting module 853 may include a first judging unit 8533 and a second correcting unit 8534. The block 0533 may be implemented by the first judging unit 8533. The block 0534 can be implemented by the second correcting unit 8534. That is, the first judging unit 8533 may be configured to determine whether the user wears glasses according to the facial image. The second correcting unit 8534 may be configured to correct the current distance based on the first ratio and a distance coefficient, when the user wears glasses.

Figure 38:
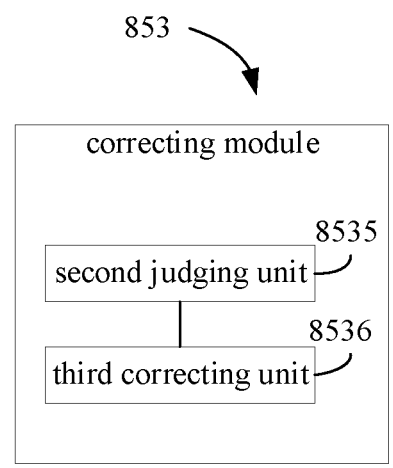
FIG. 38 is a schematic block diagram illustrating a correcting module in a device for controlling a laser projection module according to some implementations of the present disclosure.

As illustrated in FIG. 38, in some implementations, the block 0535 may be implemented by the second judging unit 8535. The block 0536 may be implemented by the third correcting unit 8536. That is, the second judging unit 8535 may be configured to determine an age of the user based on the facial image. The third correcting unit 8536 may be configured to correct the current distance based on the first ratio and the age.

The depth camera and the electronic device according to the present disclosure will be described as below.

Figure 39:
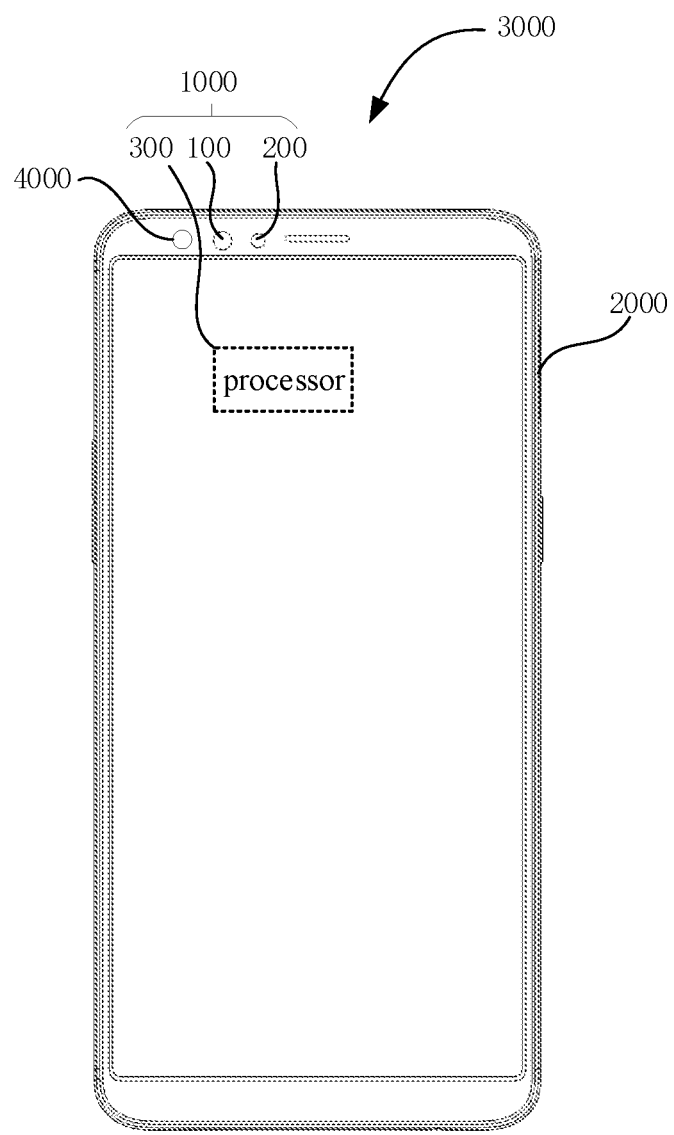
FIG. 39 is a schematic diagram illustrating an electronic device according to some implementations of the present disclosure.
Figure 40:
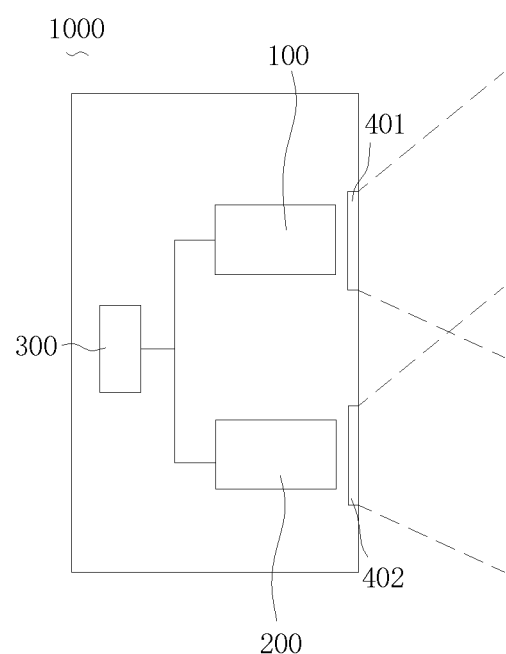
FIG. 40 is a schematic diagram illustrating a depth camera according to some implementations of the present disclosure.

As illustrated in FIG. 39, the present disclosure provides an electronic device 3000. The electronic device 3000 includes a housing 2000 and a depth camera 1000. The depth camera 1000 is disposed in the housing 2000 and exposed from the housing 2000 to obtain a depth image. The electronic device 3000 may be a phone, a tablet computer, a notebook computer, a smart watch, a smart wrist strap, smart glasses, a smart helmet, and the like.

As illustrated in FIG. 30, the depth camera 1000 includes an imager 200, a laser projection module 100 and a processor 300. The imager 200 may be configured to receive a laser pattern. The imager 200 may be an infrared camera. The processor 300 may be configured to process the laser pattern to obtain a depth image.

The laser projection module 100 are described above in implementations related to the method for controlling the laser projection module, which is not explained herein.

As illustrated in FIG. 39, in some implementations, the blocks 001, 002 and 003 may also be implemented by the processor 300. That is, the processor 300 is configured to obtain a current distance between the laser projection module 100 and a user, determine a target number of light-emitting arrays from the plurality of light-emitting arrays 111 according to the current distance, and activate point light sources 101 in the target number of light-emitting arrays 111.

In some implementations, the plurality of the light-emitting arrays 111 include a plurality of fan-shaped arrays 111, and the plurality of the fan-shaped arrays 111 collectively form a circular array 11. The plurality of the fan-shaped arrays 111 are controlled independently. Therefore, the processor 300 may be configured to obtain the current distance between the laser projection module 100 and the user, determine a target number of fan-shaped arrays from the plurality of fan-shaped arrays 111 according to the current distance, and activate the point light sources 101 in the target number of fan-shaped arrays 111.

In some implementations, the plurality of light-emitting arrays 111 include a plurality of sub-arrays 111. The plurality of sub-arrays 111 form a circular array 11. The plurality of sub-arrays 111 include a circular sub-array 113 and an annular sub-array 112. The number of the circular sub-array 113 is one, and the number of the annular sub-array 112 is one or more. Therefore, the processor 300 may be configured to obtain the current distance between the laser projection module 100 and the user, determine the target number of sub-arrays 111 from the plurality of sub-arrays 111 according to the current distance, and activate the point light sources 101 in the target number of sub-arrays 111.

As illustrated in FIG. 39, in some implementations, when the plurality of light-emitting arrays 111 include a plurality of fan-shaped arrays 111 as illustrated in FIG. 3, or the plurality of light-emitting arrays 111 are a plurality of sub-arrays 111 including a circular sub-array 113 and an annular sub-array 112 as illustrated in FIG. 5, the blocks 011, 012, and 013 may be implemented by the processor 300. That is, the processor 300 may be further configured to obtain a facial image of the user, process the facial image to determine a first ratio of a face of the user to the facial image, and determine the current distance based on the first ratio. The facial image may be captured by the imager 200. The processor 300 may be electrically connected to the imager 200 and read the facial image from the imager 200.

As illustrated in FIG. 39, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-array 113 and an annular sub-array 112 as illustrated in FIG. 5, the blocks 0131 and 0132 may also be implemented by the processor 300. That is, the processor 300 may be further configured to calculate a second ratio of a preset feature region of the face in the facial image to the face, and to calculate the current distance based on the first ratio and the second ratio.

As illustrated in FIG. 39, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-array 113 and an annular sub-array 112 as illustrated in FIG. 5, the blocks 0133 and 0134 may also be implemented by the processor 300. That is, the processor 300 may be configured to determine whether the user wears glasses according to the facial image and to calculate the current distance based on the first ratio and a preset distance coefficient when the user wears glasses.

As illustrated in FIG. 39, in some implementations, when the plurality of the light-emitting arrays 111 include a plurality of the fan-shaped arrays 111 as illustrated in FIG. 3, or the plurality of the light-emitting arrays 111 are a plurality of sub-arrays 111 including a circular sub-arrays 113 and an annular sub-array 112 as illustrated in FIG. 5, the blocks 0135 and 0136 may also be implemented by the processor 300. That is, the processor 300 may be further configured to determine the age of the user according to the facial image and adjust the current distance based on the first ratio and the age of the user.

As illustrated in FIG. 39, in some implementations, when the plurality of the light-emitting arrays 111 include a plurality of the fan-shaped arrays 111 as illustrated in FIG.

3, or the plurality of the light-emitting arrays 111 are a plurality of sub-arrays 111 including a circular sub-array 113 and an annular sub-array 112 as illustrated in FIG. 5, the block 014 may be implemented by the laser projection module 100. The block 015 may be implemented by the processor 300. That is, the laser projection module 100 may be configured to transmit a detection signal to the user. The processor 300 may be configured to calculate the current distance according to a detection signal reflected by the user.

As illustrated in FIG. 39, in some implementations, the block 04 may also be implemented by the processor 300. That is, the processor 300 may be further configured to activate a predetermined number of the light-emitting arrays 111 to detect the current distance between the user and the laser projection module 100.

As illustrated in FIG. 39, in some implementations, the block 06 and the block 07 may be implemented by the processor 300. That is, the processor 300 may be configured to obtain the first image and the second image of the user, and to calculate the current distance between the user and the laser projection module 100 according to the first image and the second image.

As illustrated in FIG. 39, in some implementations, the blocks 051, 052 and 053 may be implemented by the processor 300. That is, the processor 300 may be further configured to obtain a facial image of the user, calculate a first ratio of a face to the facial image, and correct the current distance based on the first ratio.

As illustrated in FIG. 39, in some implementations, the block 0531 and the block 0532 may be implemented by the processor 300. That is, the processor 300 may be further configured to calculate a second ratio of a preset feature region of the face in the facial image to the face and to correct the current distance based on the first ratio and the second ratio.

As illustrated in FIG. 39, in some implementations, the blocks 0533 and 0534 may be implemented by the processor 300. That is, the processor 300 may be further configured to determine whether the user wears glasses according to the facial image and to correct the current distance based on the first ratio and a distance coefficient, when the user wears glasses.

As illustrated in FIG. 39, in some implementations, the block 0535 and the block 0536 may be implemented by the processor 300. That is, the processor 300 may be further configured to determine an age of the user according to the facial image, and correct the current distance based on the first ratio and the age.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

The flow chart or any process or method described herein in other manners may be understood to represent a module, segment, or portion of code that includes one or more executable instructions to implement the specified logic function(s) or that includes one or more executable instructions of the steps of the progress. Scope of the present disclosure may include other implementations which may be out of the order illustrated herein or discussed herein, including a basically simultaneous order or a reverse order, for executing functions, which may be understood by those skilled in the art of embodiments of the present disclosure.

The logic and/or step illustrated herein in the flow chart or described in other manners, for example, a particular sequence table of executable instructions for realizing the logical function, may be specifically implemented in any computer readable medium, to be used by the instruction execution system, device or equipment (such as the system based on computers, the system comprising processors or other systems capable of obtaining and executing the instruction from the instruction execution system, device and equipment), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include (a non-exhaustive list) but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and edited, decrypted or processed with other appropriate methods when it is necessary to obtain the programs in an electric manner. The programs may be stored in the computer memories.

It should be understood that each part of the present disclosure may be realized by hardware, software, firmware or their combination. In the above implementations, multiple blocks or methods may be realized by the software or firmware stored in the memory and executable by the appropriate instruction execution system. For example, when being realized by the hardware, likewise in another implementation, the blocks or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the blocks in the above exemplifying method of the present disclosure may be achieved by instructing the related hardware with programs. The programs may be stored in a computer readable storage medium, and one or a combination of the blocks in the method embodiments of the present disclosure may be included when the programs are running on a computer.

In addition, each functional unit of the embodiments of the present disclosure may be integrated in a processing module, or may be separate physical elements, or two or more of these units are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be a read-only memory, a magnetic disk, a compact disc (CD), etc. Although explanatory embodiments have been illustrated and described, it would be understood that the above embodiments cannot be construed to limit the present disclosure, and changes, modifications, alternatives, and variants can be made by those skilled in the art without within the scope of the present disclosure.

What is claimed is:

1. A method for controlling a laser projection module, wherein the laser projection module comprises a plurality of point light sources, the plurality of point light sources are grouped to form a plurality of light-emitting arrays, the plurality of light-emitting arrays are controlled independently, and the method comprises:
   obtaining a current distance between the laser projection module and a user;
   determining a target number of light-emitting arrays from the plurality of light-emitting arrays according to the current distance; and
   activating point light sources in the target number of light-emitting arrays,
   wherein determining the target number of light-emitting arrays and activating the point light sources comprises:
      in response to determining that the current distance is within a first distance range, activating the point light sources in a first target number of light-emitting arrays from the plurality of light-emitting arrays;
      in response to determining that the current distance is within a second distance range, activating the point light sources in a second target number of light-emitting arrays from the plurality of light-emitting arrays; and
      in response to determining that the current distance is within a third distance range, activating the point light sources in a third target number of light-emitting arrays from the plurality of light-emitting arrays;
      wherein the second distance range is between the first distance range and the third distance range, and the second target number is greater than the first target number and is less than the third target number.

2. The method of claim 1, wherein obtaining the current distance between the laser projection module and the user comprises:
   obtaining a facial image of the user;
   processing the facial image to determine a first ratio of a face of the user to the facial image; and
   determining the current distance based on the first ratio.

3. The method of claim 2, further comprising:
   calculating a second ratio of a preset feature region of the face in the facial image to the face; and
   correcting the current distance based on the second ratio.

4. The method of claim 1, wherein obtaining the current distance between the laser projection module and the user comprises:
   transmitting a detection signal to the user, calculating the current distance according to a detection signal reflected by the user, or
   activating a predetermined number of light-emitting arrays to detect the current distance between the user and the laser projection module, or
   obtaining a first image and a second image of the user, and calculating the current distance between the user and the laser projection module according to the first image and the second image.

5. The method of claim 4, further comprising:
   correcting the current distance by obtaining a facial image of the user, calculating a correction value based on the facial image, and correcting the current distance based on the correction value;
   wherein the correction value is related to a first ratio of a face of the user to the facial image, a second ratio of a preset feature region of the face in the facial image to the face, an age of the user, and a decision on whether the user wears glasses.

6. The method of claim 1, further comprising:
   determining a target number of fan-shaped arrays from a plurality of fan-shaped arrays according to the current distance; and activating the point light sources in the target number of fan-shaped arrays, in response to determining that the plurality of light-emitting arrays comprise a plurality of fan-shaped arrays, the plurality of fan-shaped arrays collectively form a circular array, and the plurality of fan-shaped arrays are controlled independently;
   activating the target number of fan-shaped arrays centrosymmetrically with respect to a center of a laser emitter, in response to determining that the target number is equal to or greater than 2 and the number of the plurality of fan-shaped arrays is a multiple of the target number; or
   activating the target number of fan-shaped arrays centrosymmetrically with respect to a center of the laser emitter, in response to determining that the target number is equal to or greater than 2 and the number of the plurality of fan-shaped arrays is even.

7. The method of claim 1, further comprising:
   determining a target number of sub-arrays from a plurality of sub-arrays according to the current distance and activating the point light sources in the target number of sub-arrays, in response to determining that the plurality of light-emitting arrays comprise a plurality of sub-arrays, the plurality of sub-arrays collectively form a circular array, and the plurality of sub-arrays comprises a circular sub-array and at least one annular sub-array; or
   determining the target number of sub-arrays from the plurality of sub-arrays according to the current distance and activating the point light sources in the target number of sub-arrays, in response to determining that the plurality of light-emitting arrays comprises a plurality of sub-arrays, the plurality of sub-arrays collectively form a rectangle array, and the plurality of sub-arrays comprises a rectangle sub-array and at least one ring-shaped sub-array.

8. The method of claim 7, further comprising:
   in response to determining that the plurality of sub-arrays comprises a circular sub-array and at least one annular sub-array, the point light sources in the sub-array farther away from a center of the circular sub-array having higher power; or
   activating the point light sources in the at least one annular sub-array in response to determining that the current distance is within a first distance range, and activating the point light sources in the circular sub-array in response to determining that the current distance is within a second distance range; an upper limit of the first distance range being less than or equal to a lower limit of the second distance range.

9. The method of claim 1, further comprising:
determining a target number of rectangle sub-arrays from a plurality of rectangle sub-arrays according to the current distance and activating the point light sources in the target number of rectangle sub-arrays, in response to determining that the plurality of light-emitting arrays comprise a plurality of rectangle sub-arrays, the plurality of rectangle sub-arrays collectively form a rectangle array, and the plurality of rectangle sub-arrays are controlled independently;
wherein the plurality of rectangle sub-arrays have a same size to each other or have different sizes from each other.

10. A depth camera, comprising an imager and a laser projection module, wherein the laser projection module comprises a plurality of point light sources, the plurality of point light sources are grouped to form a plurality of light-emitting arrays, and the plurality of light-emitting arrays are controlled independently; the depth camera further comprises a processor, the processor is configured to:
obtain a current distance between the laser projection module and a user;
determine a target number of light-emitting arrays from the plurality of light-emitting arrays according to the current distance; and
activate the point light sources in the target number of light-emitting arrays;
wherein in response to determining that the current distance is within a first distance range, activate the point light sources in a first target number of light-emitting arrays from the plurality of light-emitting arrays;
wherein in response to determining that the current distance is within a second distance range, activate the point light sources in a second target number of light-emitting arrays from the plurality of light-emitting arrays;
wherein in response to determining that the current distance is within a third distance range, activate the point light sources in a third target number of light-emitting arrays from the plurality of light-emitting arrays; and
wherein the second distance range is between the first distance range and the third distance range, and the second target number is greater than the first target number and is less than the third target number.

11. The depth camera of claim 10, wherein the processor is further configured to:
obtain a facial image of the user;
process the facial image to determine a first ratio of a face of the user to the facial image; and
determine the current distance based on the first ratio.

12. The depth camera of claim 11, wherein the processor is further configured to:
calculate a second ratio of a preset feature region of the face in the facial image to the face; and
correct the current distance based on the second ratio.

13. The depth camera of claim 10, wherein,
the laser projection module is configured to transmit a detection signal to the user and the processor is further configured to calculate the current distance according to a detection signal reflected by the user; or
the processor is configured to activate a predetermined number of light-emitting arrays to detect the current distance between the user and the laser projection module; or
the processor is configured to obtain a first image and a second image of the user and to calculate the current distance between the user and the laser projection module according to the first image and the second image.

14. The depth camera of claim 13, wherein the processor is further configured to correct the current distance by:
obtain a facial image of the user, calculating a correction value based on the facial image, and correcting the current distance based on the correction value,
wherein the correction value is related to a first ratio of a face of the user to the facial image, a second ratio of a preset feature region of the face in the facial image to the face, an age of the user, and a decision on whether the user wears glasses.

15. The depth camera of claim 10, wherein the processor is configured to:
determine a target number of fan-shaped arrays from a plurality of fan-shaped arrays according to the current distance and activate the point light sources in the target number of fan-shaped arrays, in response to determining that the plurality of light-emitting arrays comprise a plurality of fan-shaped arrays, the plurality of fan-shaped arrays collectively form a circular array, and the plurality of fan-shaped arrays are controlled independently; and
activate the target number of fan-shaped arrays centrosymmetrically with respect to a center of a laser emitter, in response to determining that the target number is equal to or greater than 2 and the number of the plurality of fan-shaped arrays is a multiple of the target number; or
activate the target number of fan-shaped arrays centrosymmetrically with respect to a center of the laser emitter, in response to determining that the target number is equal to or greater than 2 and the number of the plurality of fan-shaped arrays is even.

16. The depth camera of claim 10, wherein the processor is further configured to:
determine a target number of sub-arrays from a plurality of sub-arrays according to the current distance and activate the point light sources in the target number of sub-arrays, in response to determining that the plurality of light-emitting arrays comprise a plurality of sub-arrays, the plurality of sub-arrays collectively form a circular array, and the plurality of sub-arrays comprises a circular sub-array and at least one annular sub-array; or
determine the target number of sub-arrays from the plurality of sub-arrays according to the current distance and activate the point light sources in the target number of sub-arrays, in response to determining that the plurality of light-emitting arrays comprises a plurality of sub-arrays, the plurality of sub-arrays collectively form a rectangle array, and the plurality of sub-arrays comprises a rectangle sub-array and at least one ring-shaped sub-array.

17. The depth camera of claim 16, wherein,
in response to determining that the plurality of sub-arrays comprises a circular sub-array and at least one annular sub-array, the point light sources in the sub-array farther away from a center of the circular sub-array have higher power; or
the processor is further configured to activate the point light sources in the at least one annular sub-array, in response to determining that the current distance is within a first distance range; and activate the point light sources in the circular sub-array, in response to determining that the current distance is within a second distance rang, an upper limit of the first distance range being less than or equal to a lower limit of the second distance range.

18. The depth camera of claim 10, wherein the processor is further configured to:
   determine a target number of rectangle sub-arrays from a plurality of rectangle sub-arrays according to the current distance and activate the point light sources in the target number of rectangle sub-arrays, in response to determining that the plurality of light-emitting arrays comprise a plurality of rectangle sub-arrays, the plurality of rectangle sub-arrays collectively form a rectangle array, and the plurality of rectangle sub-arrays are controlled independently;
   wherein the plurality of rectangle sub-arrays have a same size to each other or have different sizes from each other.

19. An electronic device, comprising:
   a housing; and
   a depth camera, disposed in the housing and exposed from the housing to obtain a depth image;
   wherein the depth camera comprises an imager and a laser projection module, the laser projection module comprises a plurality of point light sources, the plurality of point light sources are grouped to form a plurality of light-emitting arrays, and the plurality of light-emitting arrays are controlled independently; the depth camera further comprises a processor, the processor is configured to:
   obtain a current distance between the laser projection module and a user;
   determine a target number of light-emitting arrays from the plurality of light-emitting arrays according to the current distance; and
   activate the point light sources in the target number of light-emitting arrays;
   wherein determining the target number of light-emitting arrays and activating the point light sources comprises:
      in response to determining that the current distance is within a first distance range, activating the point light sources in a first target number of light-emitting arrays from the plurality of light-emitting arrays;
      in response to determining that the current distance is within a second distance range, activating the point light sources in a second target number of light-emitting arrays from the plurality of light-emitting arrays; and
      in response to determining that the current distance is within a third distance range, activating the point light sources in a third target number of light-emitting arrays from the plurality of light-emitting arrays;
   wherein the second distance range is between the first distance range and the third distance range; and the second target number is greater than the first target number and is less than the third target number.

* * * * *